(12) United States Patent
Shah et al.

(10) Patent No.: US 11,100,020 B2
(45) Date of Patent: Aug. 24, 2021

(54) HYBRID CONTROL PLANE DATA LINK AGENT AND PROTOCOL

(71) Applicant: EOS Defense Systems USA, Inc., Huntsville, AL (US)

(72) Inventors: Sunil Praful Shah, San Jose, CA (US); Ranjit Vadlamudi, San Jose, CA (US); Michael K. Bugenhagen, Leawood, KS (US); Aniruddha R. Karmarkar, San Jose, CA (US); Mark B. Saxelby, Milpitas, CA (US); Abelino C. Valdez, Tracy, CA (US)

(73) Assignee: EOS Defense Systems USA, Inc., Huntsville, AL (US)

( * ) Notice: Subject to any disclaimer, the term of this patent is extended or adjusted under 35 U.S.C. 154(b) by 0 days.

(21) Appl. No.: 16/802,457

(22) Filed: Feb. 26, 2020

(65) Prior Publication Data

US 2020/0272780 A1 Aug. 27, 2020

Related U.S. Application Data

(60) Provisional application No. 62/811,500, filed on Feb. 27, 2019.

(51) Int. Cl.
*G06F 30/33* (2020.01)
*G06F 13/368* (2006.01)
(Continued)

(52) U.S. Cl.
CPC ............ *G06F 13/368* (2013.01); *G06F 30/34* (2020.01); *G06F 2115/06* (2020.01)

(58) Field of Classification Search
CPC .. G06F 15/78; G06F 15/7825; G06F 11/3636; G06F 11/366; G06F 16/21;
(Continued)

(56) References Cited

U.S. PATENT DOCUMENTS 6,763,195 B1 7/2004 Willebrand et al.
8,374,645 B2 2/2013 Elliott
(Continued)

OTHER PUBLICATIONS

International Search Report and Written Opinion, Patent Cooperation Treaty Application No. PCT/US2020/019989, dated Sep. 1, 2020, 14 pages.
(Continued)

*Primary Examiner* — Binh C Tat
(74) *Attorney, Agent, or Firm* — Fenwick & West LLP

(57) ABSTRACT

Novel tools and techniques in a telecommunication network are provided for implementing a data link layer control plane that may comply with the Ethernet standard and with sub-millisecond transmission control capabilities across multiple dis-similar technologies and bandwidth links. The framework provides a dynamic modular traffic control function insertion, removal, mapping function by having interpreter functions in the protocol agents that can map states and commands to sub-service chain functions that are configured per path and quality of service (QoS) flows. The control protocol provides high levels of resiliency and reliability by having a replicating function that transmits the same control protocol frames across multiple links simultaneously. The agents are multi-chassis capable and support hitless service impacts for administrative changes. Control plane messages may be encoded as a data plane frame and be transmitted at a high rate using the data plane.

20 Claims, 22 Drawing Sheets

(51) Int. Cl.
*G06F 30/34* (2020.01)
*G06F 115/06* (2020.01)

(58) Field of Classification Search
CPC ....... G06F 2009/45595; G06F 9/45558; G06F 13/368; G06F 2115/06; G06F 30/34; G06F 9/5072; G06F 1/266; G06F 1/3209; G06F 1/324; G06F 16/1824; G06F 9/5044; G06F 9/505; H04L 27/2636; H04L 1/0083; H04L 12/4641; H04L 41/0213; H04L 43/00; H04W 80/00; H04W 8/18
USPC ................................................ 716/100–108
See application file for complete search history.

(56) References Cited

U.S. PATENT DOCUMENTS

| | | | |
|---|---|---|---|
| 8,830,875 B1* | 9/2014 | Bulusu | H04L 45/48 370/256 |
| 9,094,163 B2 | 7/2015 | Saint Georges et al. | |
| 9,166,684 B2 | 10/2015 | Pusarla et al. | |
| 10,075,335 B1 | 9/2018 | Vicisano et al. | |
| 10,164,829 B1 | 12/2018 | Watson et al. | |
| 2008/0037425 A1* | 2/2008 | Pan | H04L 29/06027 370/235 |
| 2009/0161547 A1 | 6/2009 | Riddle et al. | |
| 2014/0269433 A1 | 9/2014 | Allan et al. | |
| 2015/0103691 A1 | 4/2015 | Bhattacharya et al. | |
| 2018/0335824 A1* | 11/2018 | MacNamara | H04L 41/0893 |

OTHER PUBLICATIONS

5G Workgroup, "Unlicensed Integration with 5G Networks," Wireless Broadband Alliance, Oct. 2018, Version 1.0, 63 pages.
Keukeleire, N. et al., "Increasing broadband reach with Hybrid Access Networks," arXiv preprint arXiv:1907.04570, Jul. 10, 2019, pp. 1-6.
Quinn, P. et al., "Network Service Header (NSH)," Internet Engineering Task Force (IETF), Jan. 2018, ISSN 2070-1721, pp. 1-47.
Halpern, J. et al., "Service Function Chaining (SFC) Architecture," Internet Engineering Task Force (IETF), Oct. 2015, ISSN 2070-1721, pp. 1-38.

* cited by examiner

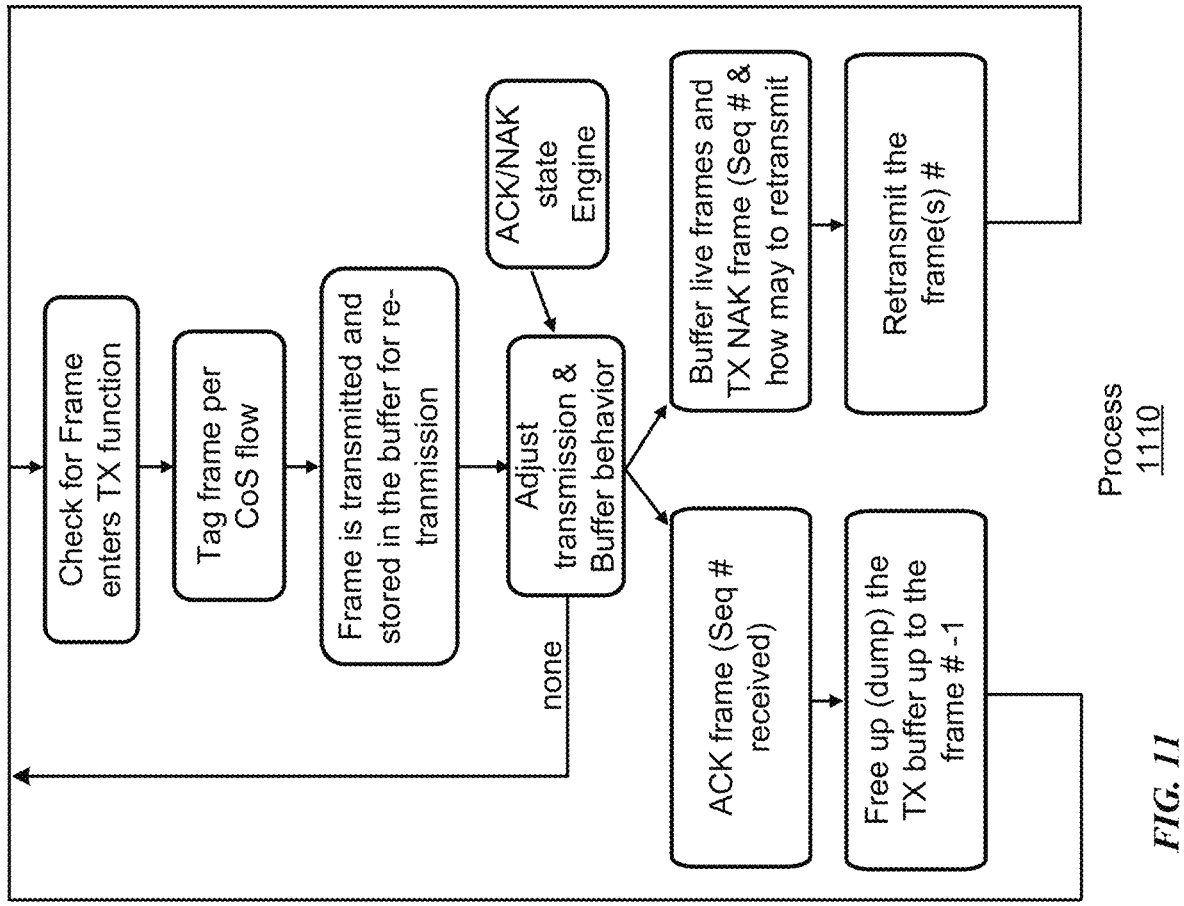
FIG. 11
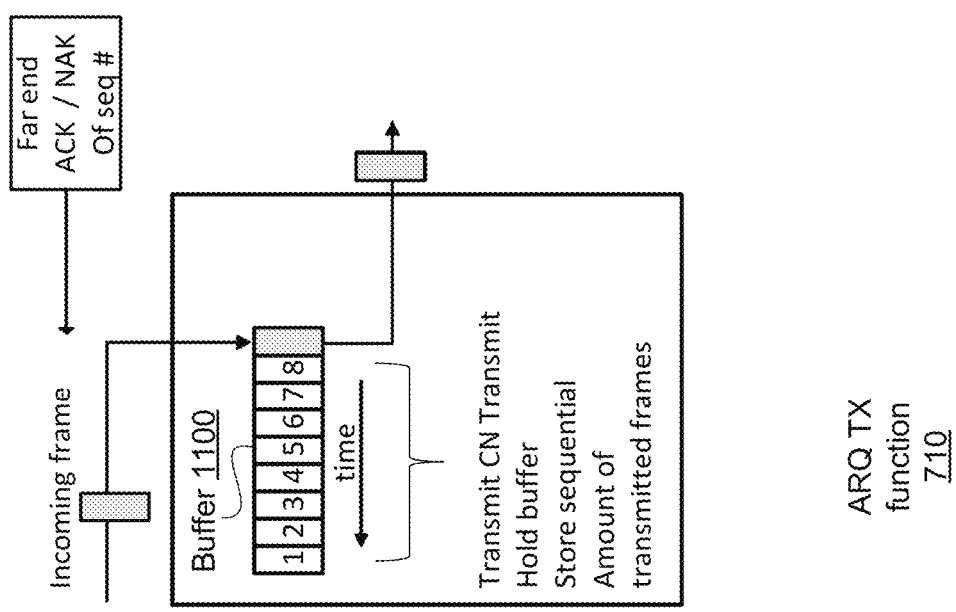

| 1401 | 1402 | 1403 | 1404 | 1405 | 1406 | 1407 | 1408 |
|---|---|---|---|---|---|---|---|
| Classification method | COS Level mapping | Transmission Facility (redundancy of flow) | ARQ (TFC 1) | Max Delay | Scheduler type | Weight in % | Rate Limit |
| | 0 thru 8 | FSO | Yes or No | In milliseconds (50) | Strict or DWRR | | Byte rate/ bite rate |
| Port | | RF (E-band) | | | | | |
| Port & VLAN | | Redundant (both FSO & E-band) | | | | | |
| Port/ VLAN/ & PCP | | | | | | | |
| Port/ VLAN/ PCP & DSCP | | | | | | | |

1409, 1410, 1411, 1412, 1413 (row labels)

HYBRID CONTROL PLANE DATA LINK AGENT AND PROTOCOL

CROSS-REFERENCE TO RELATED APPLICATION

This application claims priority to Provisional Patent Application Ser. No. 62/811,500, "Data Link Protocol for Disparate Communication Channels," filed on Feb. 27, 2019. the subject matter of which is incorporated herein by reference in its entirety.

BACKGROUND

Technical Field

This description relates to control plane agents and protocols in a telecommunication network, such as in the data link layer.

Description of Related Art

Free Space Optics can transmit at extremely high rates but have a vulnerability to short duration transmission interruption caused by atmospheric impairments or objects interfering with the beam. Conventionally, re-transmission occurs at other layers than the data link layer such as the physical layer or the Internet Protocol layers. High-speed re-transmission occurring at the physical layer is problematic due to vendor chip inter-operability, and the cost of changing optics to upgrade or improve the transmission facilities. Transport layer protocols such as TCP (transmission control protocol) have flow level transmission correction, however, TCP mechanisms are impacted by round-trip delays, and packet loss and use throughput throttling with exponential back-off before restoring throughput to the flow. These methods are both crude and too lengthy to provide transmission control over a wireless or FSO link and are also unsuitable due to the impacts on the service state machines that are reacting in the milliseconds duration. These mechanisms could also create race conditions and low-quality services for any real-time communication across a loss-full environment such as FSO, and unregulated wireless spectrum.

With the advent of higher speed Central Processing Units that can run at "line rate" (transmission rates) in the gigahertz speed, Network Processing Units (NPU) and more programable data path functions and applications have emerged and are now capable of replacing dedicated Application Specific Integrated Circuits (ASIC). This new programmable environment allows for functions of the data link layer performing at rates normally only viable at the physical transmission layer.

SUMMARY

In one embodiment, a method for operating a telecommunication network having a data plane and a control plane is described. The method may include receiving, at a first network node, (i) a control plane message that belongs to the control plane and (ii) mapping information associated with how the control plane message should be transmitted. The method may also include determining, based on the mapping information, whether the control plane message is to be sent via the data plane or the control plane. In response to determining that the control plane message is to be sent via the data plane, a network node may transmit a data plane frame via the data plane by injecting the data plane frame into a traffic of data payload frames. The data plane frame carries a version of the control plane message and has a marking signifying that the data plane frame carries the control plane message. In response to determining that the control plane message is to be sent via the control plane, the network node may transmit a control plane frame encapsulating the control plane message via the control plane.

In another embodiment, a method for operating a telecommunication network having a data plane and a control plane. The method may include receiving, at a first network node, a control plane message. The first network node is capable of transmitting data via a plurality of channels of different media under one of a plurality of flow paths and under one of a plurality of quality of service (QoS) requirements. The plurality of channels between the first network node and a second network node may be regulated across by an automatic repeat request (ARQ). The method may also include generating, at the first network node, a frame. The frame may include the control plane message and a marking encoding that the frame carries the control plane message. The frame may be associated with a first QoS requirement. The method may further include replicating, at the first network node, the frame to generate copies of the frame. The method may further include transmitting the frame via the at least two of the channels under a first instance of the ARQ. Each channel may transmit a copy of the frame. The copies of the frame that are transmitted via different channels may be regulated under the same first instance of the ARQ while other frames associated with a different QoS requirement are regulated under a different ARQ instance. The method may further include receiving, at a second network node, one or more copies of the frame that are respectively transmitted from a different channel. The method may further include selecting, at the second network node, one or more of the received copies to extract the control plane message. The method may further include transmitting, by the second network node and responsive to receiving at least one of the copies of the frame, a positive acknowledgment specific to the first instance of the ARQ to the first network node.

In yet another embodiment, a method for operating a telecommunication network is described. The method may include receiving, at a management system of the telecommunication network, a first setting of network flow classifications, a second setting of traffic control function options, and a third setting of path channel and Quality of Service (QoS) treatment options. The telecommunication network may include a plurality of channels. The first setting may specify rules to select one or more of the following: a port, a virtual local area network, a port control protocol, or a differentiated services code point. The second setting may specify rules to select one or more of the following: a type of automatic repeat request to be used, multiplexing protocol to be used, or throttling protocol to be used. The third setting may specify rules to determine one or more of the following: a selection of one or more channels, or a selection between the data plane and control plane. The method may also include propagating the first, second, and third settings to a plurality of network nodes of the telecommunication network through one or more control plane messages. The method may further include receiving, at a first network node of the plurality of network nodes, a frame and mapping information associated with the frame. The method may further include determining, based on the mapping information and the first, second, and third settings, to use one or more channels to transmit the frame and use one or more traffic control functions in association with transmitting the frame.

In yet another embodiment, a non-transitory computer readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF DRAWINGS

Embodiments of the disclosure have other advantages and features which will be more readily apparent from the following detailed description and the appended claims, when taken in conjunction with the examples in the accompanying drawings, in which:

FIG. 11 is a conceptual diagram illustrating a modified ARQ transmitting function in a telecommunication network, according to an embodiment.

FIG. 14 is a conceptual diagram depicting configuration examples for a user portal that may be presented at a graphical user interface, according to an embodiment.

DETAILED DESCRIPTION

Figure 1:
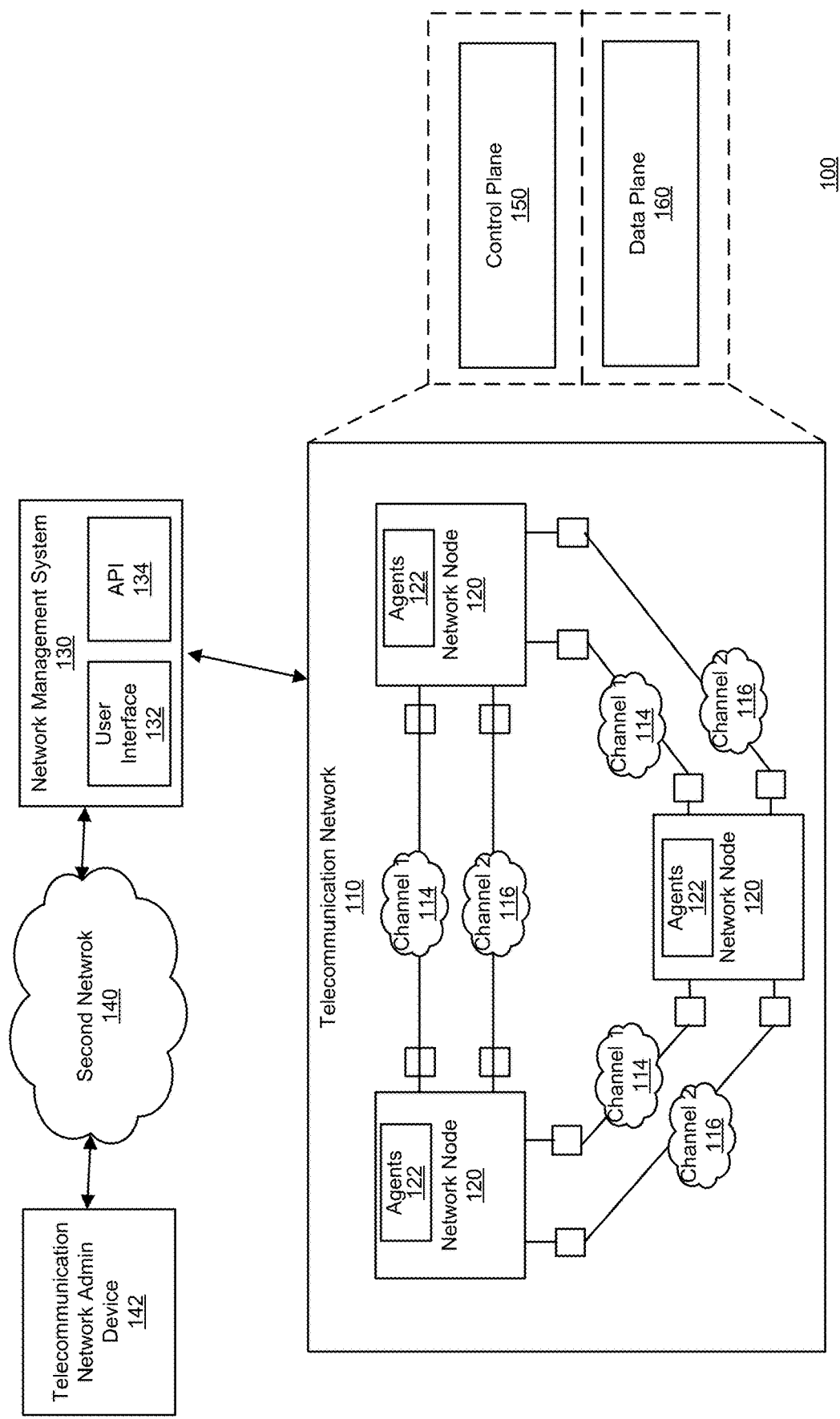
FIG. 1 is a block diagram of a system environment of an example telecommunication network, according to an embodiment.

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Various embodiments provide tools and techniques for implementing the data plane agents, traffic protection, quality of service (QoS) mechanisms, and mapping of traffic across one or more links between network nodes in a telecommunication network. A network node may provide protocol functions for the data link layer controls to perform various functions for classifying, mapping and un-mapping traffic into link flows, while providing the ability to add and subtract traffic control functions (TCFs) and/or service chain elements on-demand or at will.

In one embodiment, a network node provides a framework that allows for the correction of free space optical (FSO) transmission errors on each link via data plane messaging for TCFs such as automated retransmission requests (ARQ) at the transmission rate of the link. Data Link layer transmission of FSO technologies could be challenging due to FSO's short duration of impaired transmission characteristics. The advanced TCFs for making FSO transport reliable are facilitated by the agent framework where the protocol provides line-rate information state transfer, with an extendable modular TCF interpreter that allows network administrators to add and remove TCFs at will or on-demand to meet their specific needs for QoS handling across the transmission facilities (e.g., ports and channels) in the telecommunication network. The agent framework also improves reliability and resiliency of the telecommunication network by supporting multiple transmission types in a common link path between two or more nodes such that advanced traffic handling QoS schemas can be implemented. TCFs could be any suitable transmission functions, such as link traffic functions, maintenance functions, and other applications that are provisioned into a flow and use the data link layer agents via the interpreter.

In one embodiment, the framework of network nodes includes various functions that operate as data link layer control protocol resources with a near end network node and far end network node between which a link where the agent protocol interfaces are deployed. The framework uses traffic classification to map traffic flows into a path and QoS type identifiers inserted in each data path frame to provide the basis for applying switching, mapping, traffic control and other functions to specific traffic classification. A control plane agent may contain a high-speed protocol interface and lower-speed protocol interface that is used between the agent endpoints to transfer information between the agents that are supporting TCFs and distribute information from exterior application, programs, and other Application Program Interfaces (API's).

By way of example, according to one embodiment, a network node contains two protocol control plane agents that are used to transmit control plane messages. The two protocol control plane agents may operate at different information exchange rates. The fast agent may utilize data plane resources to perform transmission at line rate or near line rate of the selected interface for that traffic type. The fast agent uses frame insertion in each transmitted frame by extending the live traffic frames either via header insertion or frame wrapping information. The fast speed agent operates at data plane speed, which is generally in microseconds or less so that a network node may detect transmission errors in the data plane and correct them in milliseconds. The fast agent may use codified states and messages to minimize data plane processing and transmission times. The slow agent may run on the protocol control plane which transmits control plane message in the normal millisecond range and perform as most typical protocols, including verbose messaging such as Time Length Value (TLV) information, which may be a general transmission of text. Between the fast agent codified state messaging which runs at the line rate and the slow agent that handles other messages, the framework enables novel advanced transport control and messaging functions.

In one embodiment, the framework may use a structured header that is inserted in data plane frames to support modular TCFs. The TCFs may be classed by types and each sub-TCF agent uses the information of the type encoded in the structured header for the classification function and egress functions. This protocol of providing a simple structured header type where the function types are injected into the established header in the data plane enables agents that use a network processing unit (NPU) to perform at line rate even though the functions may operate at higher protocol levels. The header "type" mechanism enables the messaging operates at a speed at least an order of magnitude, and even 2 or 3 orders of magnitude faster message signaling in a typical packet-based control plane messaging.

In one embodiment, a network node may include an interpreter that handles mapping information between agents, TCFs, and other functional blocks. An interpreter may map, translate, and/or modify information from TCFs and route the information to one of the data plane or control plane agents. The interpreter may be embodied in a single or multiple pieces of code. The interpreter may perform mapping of information and commands based on types of TCFs and other information classifications. The network node agents configure the interpreter, which handles information being passed from the control plane frames to the agents and TCFs. For example, the interpreter can be configured to pass information to any of the two agents (fast or slow), thereby creating a flexible Dual framework that can be extended by adding new TCFs. Each flow has its own type of frame or information that the interpreter uses to map the information into the flow. A far end network node may simply extract that information and maps the control plane message to correct functions.

The network node agents' ability to map messages to the fast or slow agent, combined with the extendibility of interpreter using type and/or other control information to add, remove, or adjust TCFs statically or dynamically by the agent or externally via API interfaces, creates a framework that supports a plethora of other network functions outside of data link layer transmission and quality control. Natively the framework can be used to support any data path function. For example, security functions such as encryption functions can be treated as TCFs where functions are configured via the agent by mapping traffic through the agents. The end-to-end security control may be passed through the fast or slow paths via a type of TCF or other delimitation. Any paired or standalone (e.g., single end function) function can be treated as a TCF by the agents and added on-demand dynamically provided the function has a TCF type that allows the information to be mapped across one or both of the agents. Furthermore, new functions may be added by adding a new type classification with the associated messages used by that type without changing the underlying framework or protocol.

The adaptability of the frame in accordance with an embodiment will be apparent to one skilled in the arts of service chaining where a function may be a sub-component of an overall traffic service. The agents can dynamically add and/or remove TCFs, any other applications, or functions from the data plane via re-configuring the mapping elements and the setting up of the interpreter and flow. This enables the framework to host cloud functionality as part of the protocol, as well as SDN, IoT, AIN, Machine Learning, and AI. Each of these services may place their functions into the system distributed along the transmission path and use the control plane agents to convey and operate the end-to-end functions or applications. The framework may be extended to support new functions. The signaling may be mapped to the path best suited for the requirements of the control plane message.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

FIG. 1 is a block diagram illustrating a system environment 100 of an example telecommunication network 110, according to an embodiment. The system environment 100 includes the telecommunication network 110, which includes two or more network nodes 120, a network management system 130, a second network 140, and a telecommunication network administrator device 142. In various embodiments, the system environment 100 may include fewer or additional components. The system environment 100 may also include different components. The components in system environment 100 may be deployed in one or more physical devices and embodied in software, firmware, hardware, or any combinations thereof.

Telecommunication network 110 may be any communication network that transmits data and signals by any suitable channel media such as wire, optics, waveguide, radio frequency, or another suitable electromagnetic medium. The telecommunication network 110 can be of any scale from near-field to a satellite wireless network, including local area network (LAN), metropolitan area network (MAN), wide area network (WAN), long-term evolution (LTE) network, or another suitable communication network whose scale and area of coverage may not be commonly defined. The telecommunication network 110 includes two or more network nodes 120 that communicate with each other through one or more channels 114, 116, etc. While three example network nodes arranged in a ring are shown in FIG. 1, telecommunication network 110 can be in any topologies, such as point-to-point, star, mesh, chain, bus, ring, and any other suitable, regular or irregular, symmetric or not, cyclic or acyclic, fixed or dynamic (e.g., with one or more network nodes 120 moving) topologies. The telecommunication network 110 may include wireless communication between network nodes 120 that are carried by (e.g., mounted on, integrated in, or otherwise embedded) building sides, towers, other structures, surface ships, floating platforms at sea, submersible vehicles, ground vehicles such as cars or trains, airborne platforms such as airplanes, balloons, dirigibles, and other fixed- or non-fixed-wing aircraft, space platforms such as satellites, space stations, manned space vehicles, space probes, and other space vehicles.

Network nodes 120 may be any suitable distribution points, redistribution points, or endpoints of telecommunication network 110. Each network nodes 120 may include one or more agents 122. Different types of agents 122 in a network node 120 will be discussed in further detail below with reference to FIG. 2. Network nodes 120 can be any suitable data communication equipment for encoding and transmitting data frames in one or more physical layer channels. Depending on embodiments, one or more network nodes 120 can take form of gateways, routers, switches, hubs, modems, base stations, terminals, wireless access points, Internet of Things (IoT) devices, etc. that may be carried by fixed structures or mobile equipment such as satellites, vehicles, autonomous vehicles, drones, portable electronic devices. In other words, a network node 120 may be any suitable infrastructure or equipment that may be used to transmit or re-distribute data to another network node 120. Each network node 120 may communicate with another network node 120 through one or more channels 114, 116, etc. of similar or dissimilar technology types. Channels 114 and 116 can be of any suitable channel media such as free space optical (FSO) communication, E-band, microwave, mobile wireless, fixed wireless, a wired connection, an Ethernet-based transport facility, or another suitable medium. Channel 114, channel 116, and other channels may also be using the same medium but with different frequencies such as radio frequency using Wi-Fi frequency band, LTE frequency band, ultra-high frequency (UHF) band, etc. Also, the channels 114 and 116 may also use the same type of medium. For example, channel 114, channel 116, and other channels may be several FSO channels with spatial diversity. While all three of the network nodes 120 in FIG. 1 are shown to be connected by channel 114 and channel 116, any pair of network nodes 120 in telecommunication network 110 may be communicated with each other in channels that are different from those used in another pair of network nodes. For example, FSO may be available between some of the network nodes 120, but not between every network node 120.

Telecommunication network 110 may be divide logically, structurally, and/or architecturally into a control plane 150 and a data plane 160. The control plane 150 and data plane 160 are different functional layers of the telecommunication network 110 and may have separate or shared hardware and architecture, but may be separated controlled and maintained through software and sometimes certain separate hardware. Data plane 160 may be the part of the telecommunication network 110 that is used to transmit data payloads. Data payloads are live data traffic that is transmitted by network users through the telecommunication network 110. For example, website data, emails, multimedia data, and other suitable Internet packets may be transmitted through the telecommunication network 110 and are examples of data payloads. Channels 114 and 116 that are used by the data plane 160 are often operated at the line rate or close to the line rate to enable data payloads to be transmitted as fast as possible through telecommunication network 110. Data plane 160 may also be referred to as the bearer plane. Data plane 160 may contain header-based flow identifiers.

Control plane 150 may be a function layer of the telecommunication network 110 that is used to transmit information related to changes, additions, or removal of various settings and protocols of the telecommunication network 110. For example, control plane 150 is used to transmit control messages that are used to adjust the settings of one or more network nodes 120, the entire telecommunication network 110, certain channels 114 and 116, etc. Messages intended for the control plane 150 may be referred to as control plane messages, which may carry parameters and/or instructions to change one or more settings of a component in the telecommunication network 110. One example of a control plane message may be a message that carries instructions related to a traffic control function. Another example of a control plane message may include a packet or any messages that are intended for layers that are higher than data link layer. A control plane message may also be transmitted from a network node 120 to the network management system 130 and carry state information (e.g., status information) or feedback information of a component of a network node 120. Types of control plane messages may include operational messages, administration messages, maintenance messages, provisioning messages, troubleshooting messages, etc. The protocol agents 122 may include settings of a component in the telecommunication network 110. The settings may be associated with traffic control functions (TCFs), flow classification functions, mapping functions, quality of service settings, throttling management, traffic management, error control mechanisms, error correction mechanisms, data link layer protocols, multiplexing protocols, delay protocols, rate limits, scheduler types, port settings, virtual LAN (VLAN) settings, physical layer encoding protocols, physical layer error correction schemes, etc. Control plane messages are distinct from data payloads transmitted in the data plane 160 and are used to control the telecommunication network 110. It should be noted that the term control plane message may apply to protocol, configuration, and signaling messages between the agents (both fast and slow), and between the TCFs which can be mapped or encoded into the fast and slow agents.

Control plane 150 used in this disclosure may include both a control plane and a management plane. For example, in some embodiments, a control plane may handle control and protocol messages that are intended for sharing among network nodes 120 (which may be commonly referred to as east and west bound messages). A management plane, on the other hand, may handle control and protocol messages that are originated from a device outside the telecommunication network 110 or from a third party through the network management system 130 (which may be commonly referred to as north bound messages). In the embodiments that further divide control plane 150 into a control plane and a management plane, the messages intended for the management plane may be referred to as operations, administration, or management (OAM) messages. However, for embodiments that further divide control plane 150 into a control plane and a management plane, the term control plane message may include both messages intended for the control plane and the messages intended for the management plane, include OAM messages.

Network management system 130 may be a server or any computer that is used to manage the telecommunication network 110. The network management system 130 may transmit one or more administration, control and configuration messages to a network node 120. In one embodiment, the network management system 130 may directly communicate with every network node 120 in the telecommunication network 110. In another embodiment, a network node 120 that received the messages may propagate the messages to one or more other network nodes through the control plane 150. The control plane messages may be intended for all network nodes 120 or a subset of network nodes 120. The network management system 130 may provide a user interface 132 for a network administrator (e.g., a customer that purchases or leases the infrastructure of telecommunication network 110) to control and adjust one or more settings of telecommunication network 110. The user interface may take the form of a graphical user interface (GUI) to provide visual information and data for the network administrator. The network management system 130 may also include an application programming interface 134 (API) for a network administrator to use programming languages to communicate with the network management system 130. The network management system 130 may also communicate with third party systems over where the network administrator device 142 may receive information relevant to network components managed outside of the network management system 130.

A network administrator may use a telecommunication network administrator device 142 to communicate with the network management system 130 through a second network 140. The telecommunication network administrator device 142 may be one or more computing devices such as desktop computers, laptop computers, personal digital assistants (PDAs), smartphones, tablets, wearable electronic devices (e.g., smartwatches), smart household appliance (e.g., smart televisions, smart speakers, smart home hubs), Internet of Things (IoT) devices or other suitable electronic devices. The telecommunication network administrator device 142 may communicate with the network management system 130 through the user interface 132 and/or API 134. The second network 140 may be any suitable network such as the Internet, 4G, LTE, 5G, LAN, or a direct line. Telecommunication network 110 may or may not be part of the second network 140. In one embodiment, a network administrator may remotely control the settings of the telecommunication network 110 through sending commands via the Internet to the network management system 130. For example, a network engineer of a telecommunication company may control the telecommunication network 110 using API 134 through the Internet at the engineer's normal place of work. In another embodiment, a network administrator may be local to the telecommunication network 110 and he may control the network 110 through a local area network (e.g., WI-FI) or even a direct ethernet cable. As discussed in further detail below with reference to the section "Management of Telecommunication Network" below, a network administrator may dynamically change settings of telecommunication network 110.

Example Network Node Framework

Figure 2:
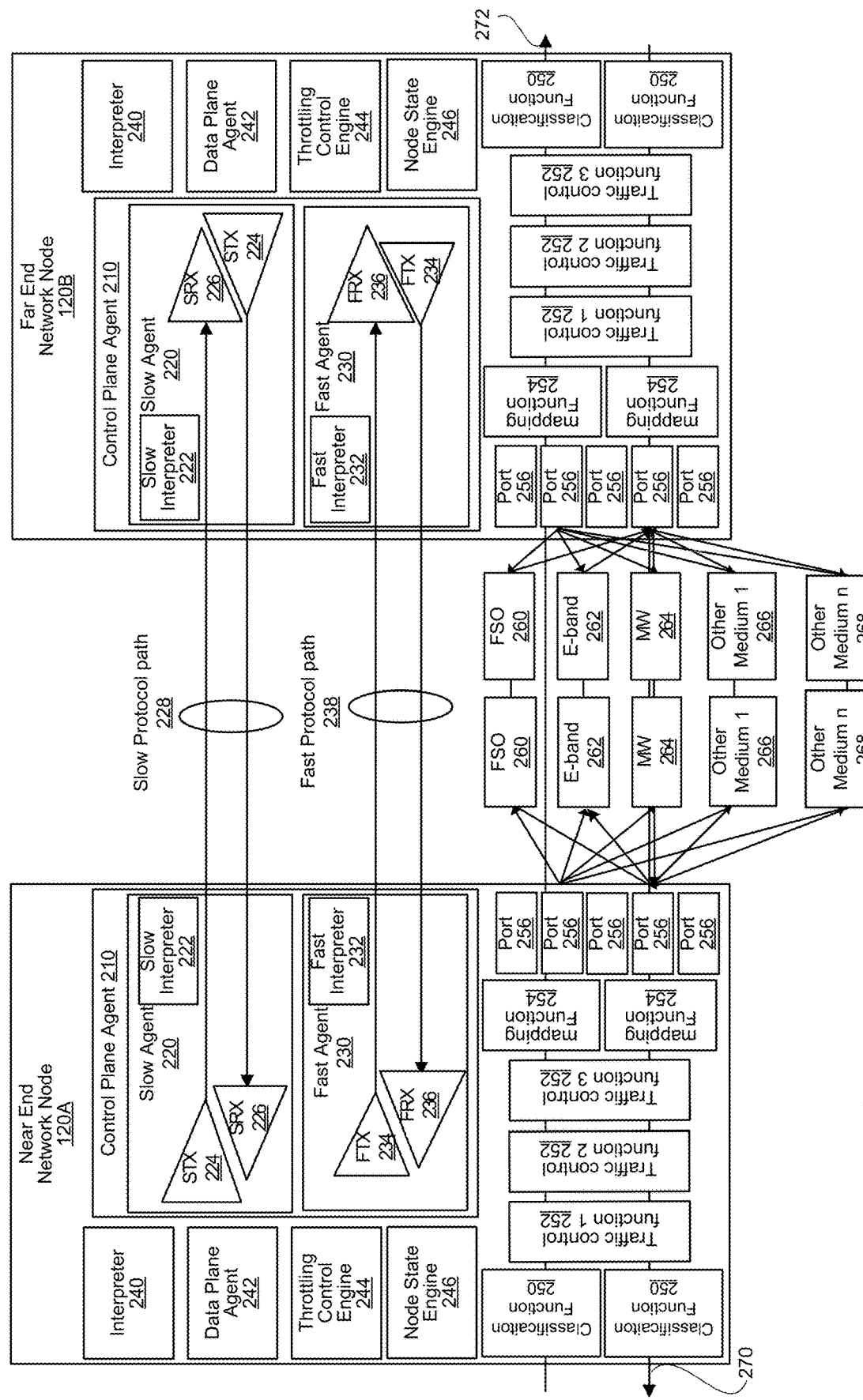
FIG. 2 is a block diagram illustrating an example framework of network nodes in a telecommunication network, according to an embodiment.

FIG. 2 is a block diagram illustrating the architecture of two example network nodes 120 in the telecommunication network 110, according to an embodiment. FIG. 2 illustrates an example framework 200 for carrying out various functions and protocol in this disclosure, according to an embodiment. The two example network nodes 120 may be referred to as a near end network node 120A and a far end network node 120B. Near end network node 120A represents a transmitting side of a network and far end network node 120B represents a receiving side of the network. In a fully duplex network, near end and far end network nodes may be equivalent. Unless further specified, these network nodes may simply be referred to as network nodes 120. Near end network node 120A and far end network node 120B may also simply be referred to as a first network node and a second network node. For a message that is received at a far end network node 120B, the message may be intended for the far end network node 120B and/or intended for another network node 120 in the telecommunication network. If the message is intended for the far end network node 120B, the far end network node 120B will process the message. If the message is intended for another network node 120, the far end network node 120B will become the near end network node 120A for the next round and forward the message to another network node 120. The message can be a control message or a data message.

A network node 120 may include a control plane agent 210, an interpreter 240, a data plane agent 242, a throttling control engine 244, a node state engine 246, and ports 256 that include or are connected to channel equipment (e.g., antennas, laser transmitters, waveguides, cables) for transmission of signals. The control plane agent 210 may be a data link layer agent. In various embodiments, a network node 120 may include fewer or additional components. A network node 120 may also include different components and the functionality of each component may also be distributed to another component or among other components. Each component may be implemented using a combination of software and hardware. For example, each network node 120 may include memory for storing instructions that define one or more software engine and one or more processors for executing the instructions to perform one or more processes described in this disclosure.

A control plane agent 210 is a data link layer agent that may be implemented as a software engine that is executed on one or more types of processors for different computations and functionalities. The control plane agent 210 manages the protocols, traffic control functions, and frameworks for transmitting and routing control plane messages to various network nodes 120. The control plane agent 210 may include a slow agent 220 and a fast agent 230 that may be run on the same or different types of processors to transmit and process messages at different speeds. For example, in one embodiment, the slow agent 220 includes instructions that are executed on a generic processor such as a central processing unit (CPU) to process and route regular control plane messages. The fast agent 230 includes instructions that are executed on a specialized processor such as a network processing unit (NPU) that may be also used by the data plane. In another embodiment, the fast agent 230 may be run on a field-programmable gate array (FPGA) or another suitable processor discussed in FIG. 22. Control plane messages processed by the NPU may be expedited and transmitted using a fast protocol path 238 at the line rate of a channel or the rate of data plane 160 by using a protocol that will be discussed in further detail below with reference to FIG. 4. The slow agent 220 may transmit messages using a slow protocol path 228 at the rate of the control plane 150 that is set by the administrator of the telecommunication network 110. The slow agent 220 includes a slow transmitter function 224 and a slow receiver function 226. The fast agent 230 includes a fast frame header insertion function 234 and a fast frame header retrieval function 236, which will be discussed in further detail with reference to FIG. 4.

Interpreter 240 may be implemented as a software engine that is executed on one or more types of processors for deciding various protocols, functions, ports, channels, quality of service (QoS) requirements. The interpreter 240 may be run on a processor separate from the processors used by slow agent 210 and the processor used by fast agent 230. A control plane message may include mapping information associated with how the control plane message should be transmitted. For example, part of the mapping information may take the form of metadata of the control plane message. In some cases, part of the mapping information may also inherent in the type of control plane message and sender of the control plane message. Interpreter 240 may receive and map TCF-related control plane messages to the slow agent 220 or the fast agent 230 for transmission to a far end network node 120B. At the far end network node 120B, the slow agent interpreter 222 or the fast agent interpreter 232 reverses the process to map the TCF-related control plane messages to the related TCFs.

The control plane agent 210 controls and holds the configuration for the flow mappings from the classification function 250 to map information payload and control plane messages into a path (e.g., one or more channels using one or more ports 256) and QoS treatment to provide the basis for applying switching, mapping, traffic control to specific traffic classification. The control plane agent 210 may also use mapping functions to provide the system for implementing routing of network traffic across one or more network nodes 120 or utilization of one or more network nodes 120 based on classification and QoS treatment of traffic flows. The control plane agent 210 may also determine one or more traffic control functions 252 (e.g., the type of automatic repeat request (ARQ), repetitive messages sent across different channel media, etc.) for information payload and control plane messages. In one embodiment, interpreter 240 may include a slow interpreter 222 that is run on a CPU and a fast interpreter 232 that is run on an NPU.

The fast agent 230 may be implemented in the data plane and be a part of the data plane agent 242, which may be a data link layer agent that may be implemented as software engine that is executed on one or more types of processors. The data plane agent 242 transmits data payloads of the telecommunication network 110 and control plane messages with special headers that are treated as part of the data traffic. In one embodiment, to increase the speed of transmission and data processing of information payloads, the data plane may be run on an NPU.

The throttling control engine 244 controls the traffic of one or more channels of a network node 120. In some cases, throttling control engine 244 may limit the bandwidth of a particular user or a particular channel to ensure the traffic associated with the user or channel does not overburden the system. The node state engine 246 monitors the status of a network node 120, including the status of ports, links, the control plane and the data plane. The node state engine 246 also monitors the status and activities of each channel. The throttling control engine 244 may provide flow pushback to ports based on the status information provided by node state engine 244.

For example, the throttling control engine 244 obtains state information on each physical and/or logical link on the network nodes 120, or the node uses a third-party channel, for the purposes of modifying flow rates through the DLL link. The throttling control engine 244 makes decisions based on the state information, information in the configuration of the services held in the data plane 160, settings on the control plane agent 210 on how to perform flow control, or push back to restrict bandwidth rates at the network side of a network node 120 when congestion situations are encountered. The network-side port 340 (shown in FIG. 3) may provide end-to-end flow information. The network-facing ports may use mechanisms such as PAUSE in mapping and pause detection function 330 (shown in FIG. 3), and other IP or Ethernet type congestion signaling to communicate flow control is needed by the network nodes 120.

In the embodiment shown in FIG. 2, the network nodes 120 may communicate with each other through more than one channel. Example channels may include FSO communication 260, E-band 262, other radio frequency such as microwave (MW) 264, and additional channel media 266 and 268. The channels 260, 262, 264, 266, and 268 in FIG. 2 are examples of channels 114 and 116 in FIG. 1. The particular types of channel media (e.g., FSO and E-band) are merely shown in FIG. 2 as examples. Channels between two network nodes 120 in any embodiments may include zero to multiple FSO 260, zero to multiple E-band 262, etc. Also, among network nodes 120, there can be different types of channels between any two network nodes 120. For example, some network nodes 120 may have the same channels, while other network nodes 120 may have different channels in a telecommunication network 110. In telecommunication network 110, a pair of network nodes 120 may be fully duplex, as represented by arrows 270 and 272. However, in some embodiments, some of the network nodes 120 may also be half duplex or simplex.

The classification functions 250, traffic control functions 252, and mapping functions 254 may include customizable variables that may be stored in a memory of a network node. Those functions may be adjustable to allow a network administrator to quickly change the settings of network nodes 120 so that those functions become "hot modifiable." The agents, engines, and other configurations of network nodes 120 may be configured by the network management system 130 by adjusting those functions. Those functions affect how a control plane message or an information payload is transmitted across the telecommunication network 110 such as the channel used, the ARQ used, etc. For example, a telecommunication network administrator device 142 may send a new transport control function or a change in a transport control function to telecommunication network 110 through network management system 130.

The framework 200 of a network node 120 shown in FIG. 2 allows the telecommunication network 110 to implement mapping and management of network traffic across one or more network channels and nodes 120. The framework can be used to address issues with FSO channel stability, but the framework can be applied to different types of data link layer functions, link aggregation, SDN, NFV, ITO, Cloud, other solutions that use VPN, and link protocols where trunk or link aggregation type methods are implemented. The framework allows a telecommunication network 110 to perform various functions required to classification, map and un-map traffic into link flows, while providing the ability to add and subtract traffic control functions on-demand or at will.

The implementation method may utilize transmission, switching, and aggregation nodes architectures and be deployed in a single device or multiple devices. More particularly the method involves traffic classifications, mapping, QoS treatment, and data link layer functions and other functions used across a link or plurality of links to provide better service performance, and the ability to dynamically change the traffic control and mapping functions used on the traffic itself.

Figure 3:
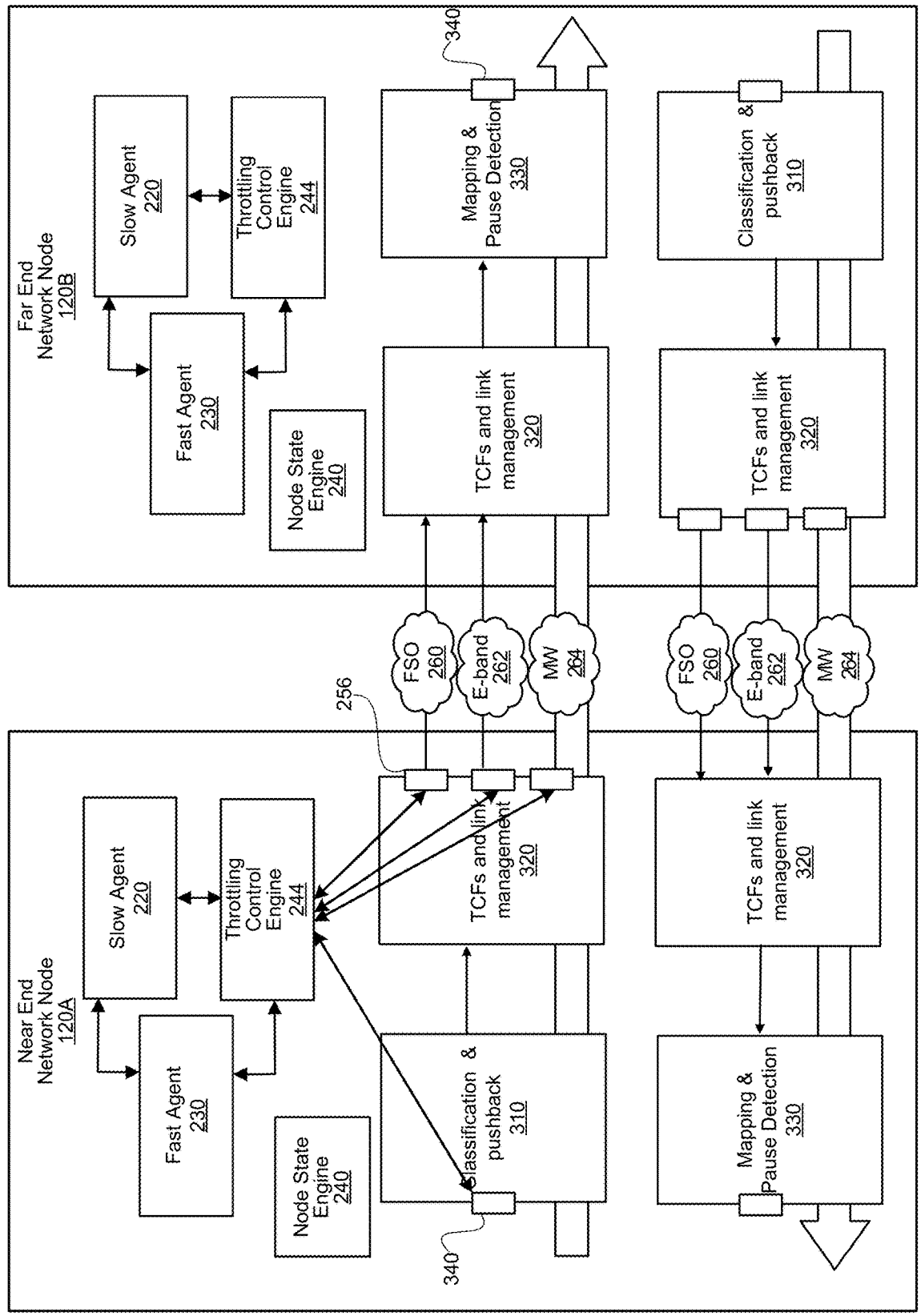
FIG. 3 is a block diagram illustrating flow management of a data plane between two network nodes, according to an embodiment.

The network node 120 implements software-defined, highly configurable, and customizable data link layer transmission and QoS control mechanisms to provide resilience to loss-full media such as FSO and unregulated Wi-Fi. Referring to FIG. 3, a block diagram illustrating flow management of a data plane 160 between two network nodes 120 in a telecommunication network 110, according to an embodiment. A network node 120 provides management and control plane features that provide fully customizable and extendable QoS treatment for data plane 160 via modularly define transmission and QoS mechanism that can be used to maintain and handle traffic flows across one or more channels.

A network node 120 includes a data plane agent 242, a control plane agent 210, a throttling control engine 244, and a node state engine 246 that are used to manage traffic between two network nodes 120. The network node 120 may include various functions such as an event and messaging function, classification, flow control, and pushback function 310, traffic control functions and link management 320, mapping and pause detection function 330 that cooperate to configure and reconfigure the data plane functions. Those functions may be configured by the network management system 130.

Example Control Plane Message Transmission

Figure 4:
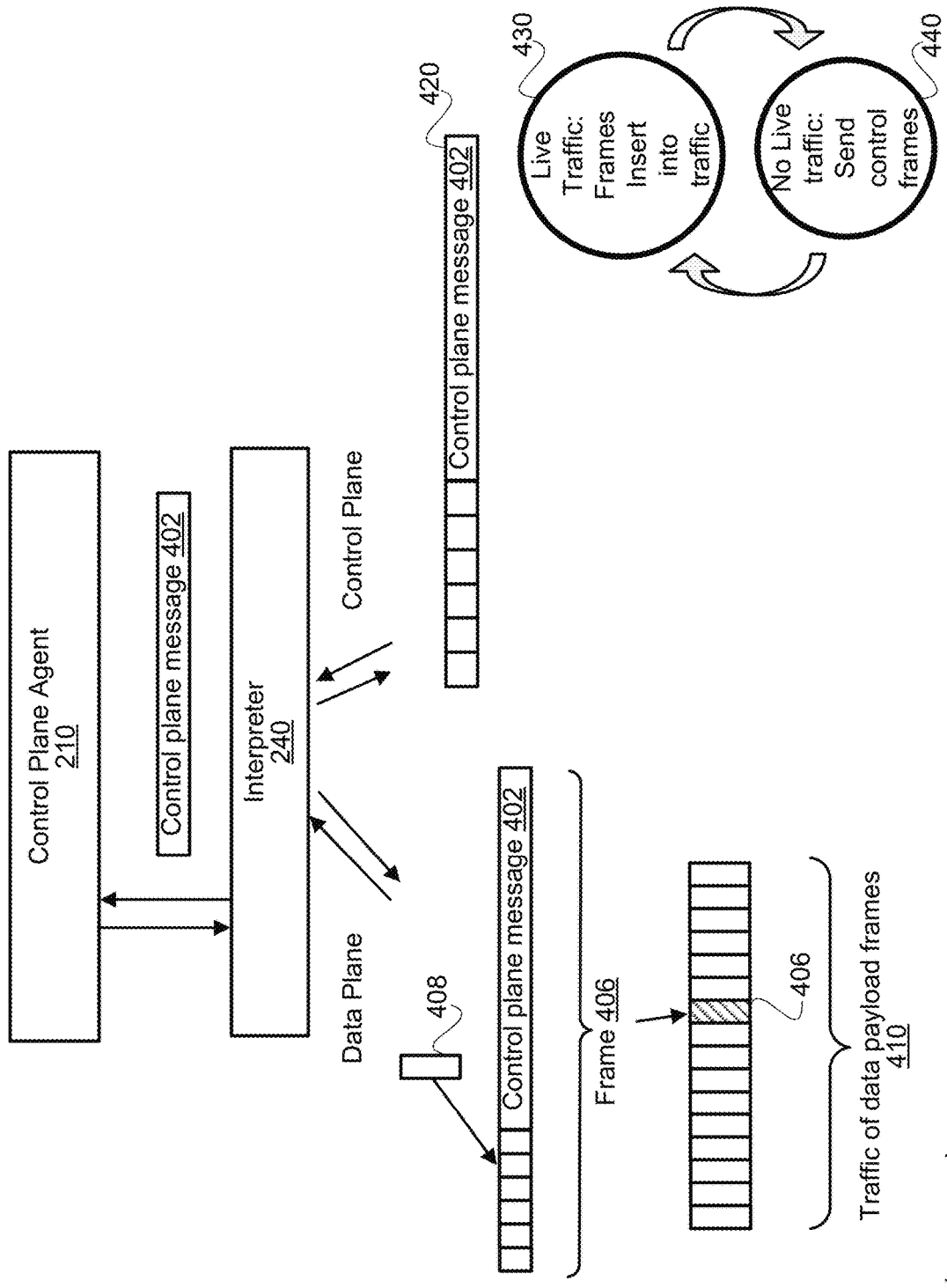
FIG. 4 is a conceptual diagram illustrating different transmission protocols for an operations, administration, or management message, according to an embodiment.

FIG. 4 is a conceptual diagram illustrating different data link layer transmission protocols that are used to send control plane messages via a slow protocol path 228 or a fast protocol path 238, according to an embodiment. Referring to various components in FIG. 2 and the illustration in FIG. 4, a control plane agent 210 may receive or generates one or more control plane messages 402. A network node 120 may receive a message when the message is transmitted form another network node 120. The message may also be originated from the network node. A control plane message 402 may belong to the control plane 150 that is from a TCF 252. The control plane agent 210 may also receive mapping information associated with how the control plane message should be transmitted. For example, the mapping information may be a set of parameters that are part of the metadata of the control plane message 402. In some cases, the mapping information includes port information, traffic control functions to be used, and QoS specification. The interpreter 240 determines, based on the mapping information, whether the control plane message 402 is to be sent via the control plane 150 or the data plane 160. The interpreter 240 may make the determination by inputting one or more parameters of the control plane message 402 to the mapping function 254 to decide whether the control plane message 402 is to be sent by which single or plurality of links. In some embodiments, the telecommunication network 110 includes a plurality of channels. The interpreter 240 may determine the states of the channels. The interpreter 240 then determines a mapping of the control plane message 402 based on the mapping information and the states of the channels to determine whether the control plane message is to be sent via alternative paths when link outages occur.

If the interpreter 240 decides that the control plane message 402 is to be sent by data plane 160, the control plane message 402 is processed by the fast agent 230. Fast agent 230 is a control plane agent but uses data plane resources to transmit the control plane message 402. In response to a determination that the control plane message 402 is to be sent via the data plane 160, the fast agent 230 may first encode the control plane message 402. For example, the fast agent 230 may turn the control plane message 402 into a shorter message based on a particular mapping and classification scheme that may be defined in mapping function 254 and classification function 250. The fast agent 230 may insert the shorter message as a structured header in a data plane frame 406. The data plane frame 406 may or may not include data payload of regular user traffic and a section of the data plane frame 406 is utilized to carry control plane message 402. The data plane frame has a marking 408 signifying that the data plane frame 406 carries the control plane message 402. In one embodiment, the marking 408 may be part of the header and may assign values based on the control plane message type. In one embodiment, the header may include two sections that are used to encode the control plane message type. The first section may include the path identifier of the control plane message 402. The second section may include the QoS level identifiers of the control plane message 402. In one embodiment, the encoded frame (e.g., with a header that is coded with the type of control plane message) may be referred to as a codified frame that is in a specific format. In one embodiment, the specific format of the data plane frame 406 complies with the Ethernet frame standard. An example structured header will be further discussed with reference to FIG. 8. In various embodiments, the fast agent 230 may also insert the control plane message 402 or an encoded shorter version of the message into another part of a data plane frame 406. For example, if a control plane message 402 includes information that may not be easily encoded to fit the space of a header, the control plane message 402 may also be put in the body of the data plane frame 406.

The network node 120 transmits the data plane frame 406 via the data plane 160 by injecting the data plane frame 406 into a traffic of data payload frames 410. Data payload frames 410 are normal information traffic of the data plane 160. The data plane frame 406 that carries a version of the control plane message 402 (e.g., the control plane message 402 itself or an encoded shorter version) is identified by the marking 408. By transmitting a control plane message 402 through the data plane 160, the control plane message 402 can be propagated to other network nodes 120 in the telecommunication network 110 at line rate of a channel or close to the line rate. As a result, control plane messages can be transmitted quickly in the network and various customizable functions, such as a network traffic control function, of the network nodes 120 can become "hot modifiable" by virtue of using the reserved header space and/or different control plane messages 420.

At a far end network node 120B, the network node 120B receives a plurality of frames transmitted via the data plane 160. The network node 120B determines that one of the received frames includes the marking (e.g., the special header) as the data plane frame 406 that encodes the control plane message 402. The network node 120B returns the control plane message 402 to a part of a flow of the control plane 150 based on the mapping information associated with the control plane message 402. The network node 120B may also determine that other frames in the received frames that do not include the marking as the data payload frames and continue to route those data payloads through the data plane 160. In one case, if a marking 408 is found in a data payload frame 410, the structured header that carries the control plane message 402 is tripped off. The control plane message 402 is forwarded to control plane 150. The rest of the data payload frame 410 is routed through the data plane 160.

If the interpreter 240 decides that the control plane message 402 is to be sent by control plane 150, the control plane message 402 is processed by the slow agent 220. The slow agent 220 generates a control plane frame 420 that encapsulates the control plane message 402. The network node 120, in turn, transmits the control plane frame 420 via the control plane 150. In some cases, the network node 120 (or a channel of the node) may toggle between two states. In a first state 430, the data plane 160 has data traffic. In a second state 440, the data plane does not have data traffic. In the first state 430, the control plane message 402 may be sent through the data plane 150 by injecting the data plane frame 406 that carries the control plane message 402 to the live traffic. In the second state 440, the control plane frame 420 may be sent via the control plane 150 or be sent via the data plane 150 during a lapse of data plane traffic.

The network node agents' ability to map messages to the fast or slow agent, combined with the extendibility of interpreter using type and/or other information to add, remove, or adjust TCFs statically or dynamically by the agent or externally via API interfaces, creates a framework that supports a plethora of other network functions outside of data link layer transmission and quality control. Natively the framework can be used to support any data path function. For example, security functions such as encryption functions can be treated as TCFs where functions are configured via the agent by mapping traffic through the agents. The end-to-end security control may be passed through the fast or slow paths via a type of TCF or other delimitation. Any paired or standalone (e.g., single end function) function can be treated as a TCF by the agents and the data may be sent as control plane messages. The functions may be added on-demand dynamically provided the function has a TCF type that allows the information to be mapped across one or both of the agents.

The adaptability of the frame in accordance with an embodiment will be apparent to one skilled in the arts of service chaining where a function may be sub-component of overall traffic service. The agents can dynamically add and/or remove TCFs, any other applications, or functions from the data plane via re-configuring the mapping elements and the setting up of the interpreter and flow. This enables the framework to host Cloud functionality as part of the protocol, as well as SDN, IOT, AIN, Math Learning, and AI. Each of these functionalities may use system functions distributed along the transmission path. The framework may be extended to support new functions. The signaling may be mapped to the path best suited for the requirements of the control plane message.

Figure 5:
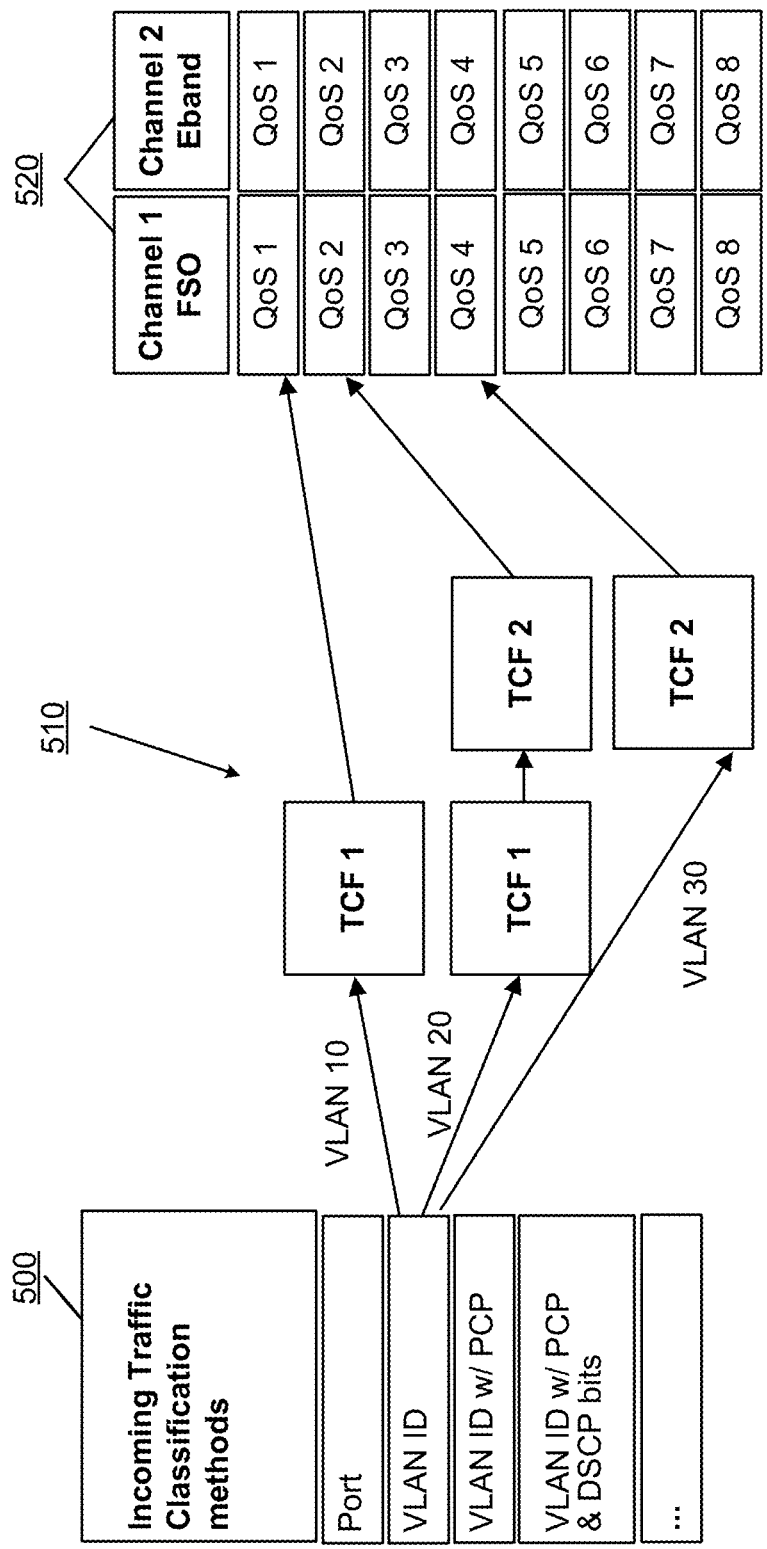
FIG. 5 is a conceptual diagram that illustrates traffic classification and mapping for paths and quality of service (QoS) in a telecommunication network, according to an embodiment.

FIG. 5 is a conceptual diagram that illustrates traffic classification and mapping for paths and QoS, according to an embodiment. The mapping and classification may be implemented as classification function 250 and mapping function 254. The classification function 250 mark or un-mark traffic flows that are mapped through the traffic control systems over the transmission channels. Table 500 shows Ethernet flow classifications whereby the network node modifies the data plane frames by encoding path and QoS information into the frames header insertion or header wrapping. The interpreters 240 maps data flows through traffic control functions and over channels as configured by the network administrator. Examples of mapping of VLAN classified flows through the TCF to channels and QoS flows are shown in 510. Table 520 illustrates a table of example channel and QoS options that are used to map the traffic. The traffic reaches the far end and maps the flow to the traffic control functions. The classification and mapping functions 250 and 254 use the special header and/or slow and fast protocols 228 and 238 to treat the flow. The network nodes 120 exchange performance, fault, and other information to perform other data link layer controls implemented in the framework.

Figure 6:
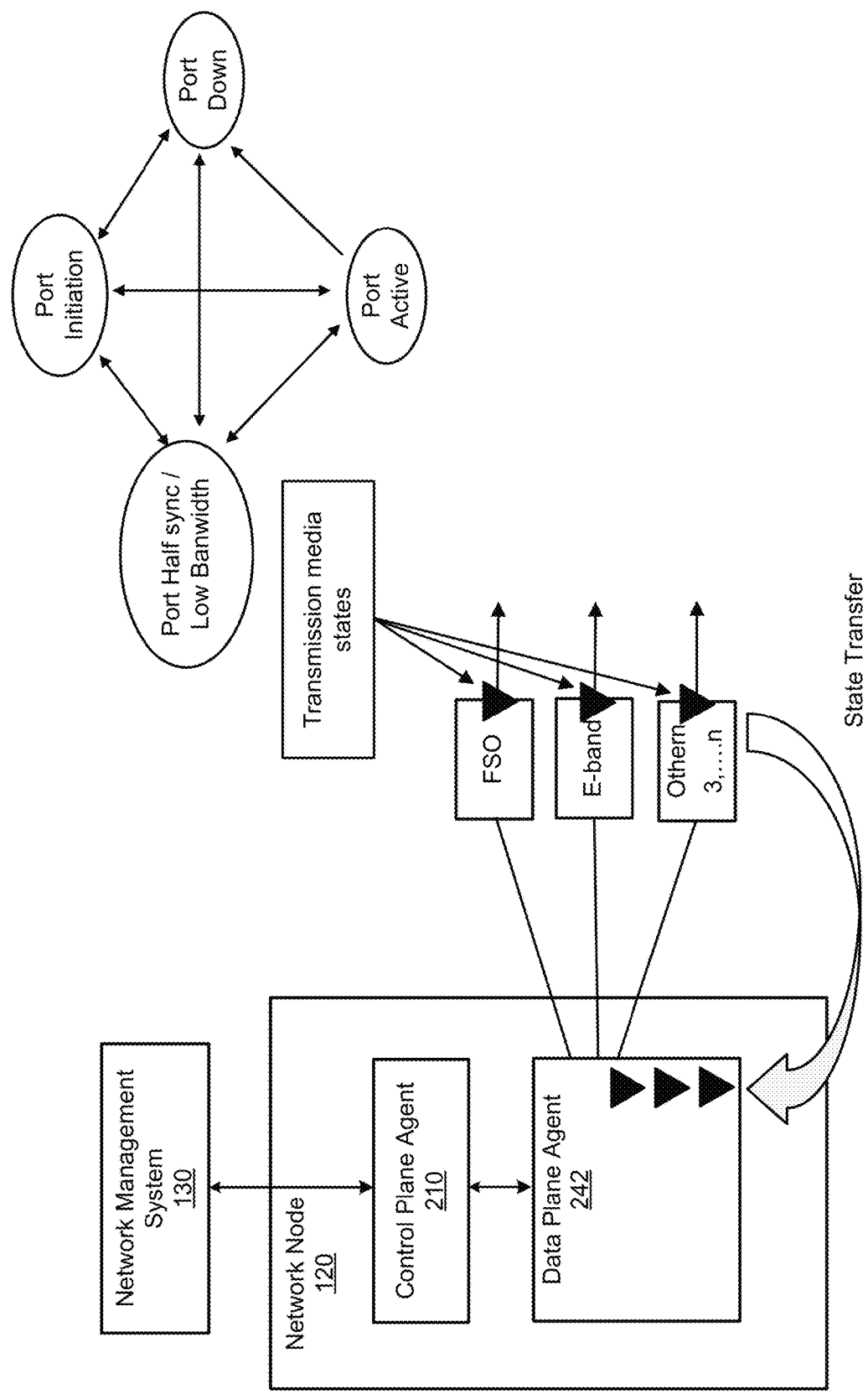
FIG. 6 is a conceptual diagram that illustrates the states of a link in a telecommunication network, according to an embodiment.

FIG. 6 is a conceptual diagram that illustrates the states of a link. A path link may use a port and a channel. The states of each link may be monitored and transferred to network node 120 via standard protocols such as SNMP, REST, etc. In some embodiments, one or more channels in the telecommunication network 110 may be operated by third parties. The state information for those third part channels can also be transmitted to network node 120. The states of a port may be classified as port initiation, port down, port active, and port half sync/low bandwidth. The state information of each port and channel may be transmitted to the network management system 130 and be viewable by a network administrator via the user interface 132 of the network management system 130. FIG. 6 shows that the states from transmission media being retrieved by network nodes 120 for decision-making purposes where the control plane agent 210 and the data plane agent 242 coordinate activities such as flow control and throttling that may be resulted from bandwidth loss or channel loss. The network management system 130 may be used for configuring the network nodes 120 in the telecommunication network 110 to set up channels, other paths, and QoS identifiers that will be used to transmit data plane traffic that is treated by traffic control functions. The control plane agent 210 and the data plane agent 242 also pull state information from the transport systems via standard state transfer protocols such as HTTP Rest, and other system communication protocols. The data plane 150 may be used to transfer information end-to-end to manage the data link layer and any specialized QoS or functions deployed across that service chain or traffic flow. The traffic control functions and egress mapping functions can utilize one or move links for any given flow to create specialized traffic treatment for any combination of channels, or a plurality of channels.

Example Traffic Control Functions (TCFs)

Figure 7:
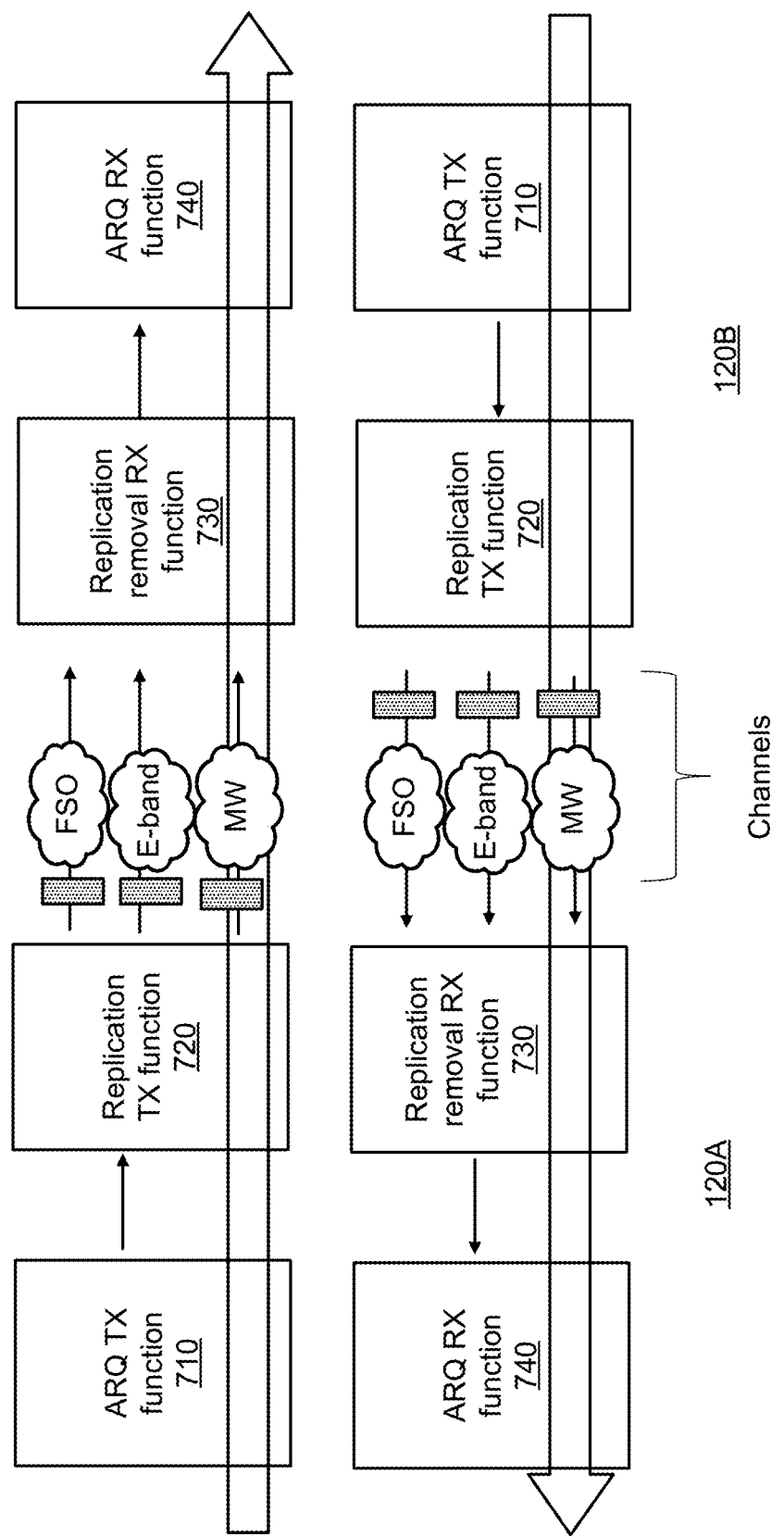
FIG. 7 is a conceptual diagram of certain example traffic control functions (TCFs) that may be implemented in a telecommunication network, according to an embodiment.

FIG. 7 is a conceptual diagram of certain example traffic control functions (TCFs) that may be implemented in a telecommunication network 110 between two network nodes 120, according to an embodiment. The network nodes 120 in a telecommunication network 110 may implement various TCFs that improve the transmission of control plane messages and information payloads. For example, in one case, the TCFs may include a modified selective ARQ, which includes the ARQ transmitting function 710 and the ARQ receiving function 740, and a replication protocol, which includes a replication transmitting function 720 and a replication removal receiving function 730. In a duplex setting, both network nodes 120 may contain the ARQ transmitting function 710, the ARQ receiving function 740, the replication transmitting function 720, and replication removal receiving function 730. However, in some embodiments, one or more network nodes 120 may also operate in a simplex setting. Each mapping and TCF may operate on its own, or as a chain of functions, to provide a customizable traffic treatment such as a customizable QoS treatment at the data link layer, even when some of the TCFs contain non-data link layer functions.

In one embodiment, network nodes 120 provide tools and techniques for implementing the modularly defined transmission and QoS mechanisms used to maintain and handle traffic flows across one or more channels between nodes. The network nodes may also dynamically or statically implement the "Micro Services" that can be added or removed from the overall transmission service without tearing down and deprovisioning the service. This ability to hot modify a service in the data link layer sub-functions that utilize the data path of a control plane between end-points to perform data link layer transmission control such as replication using functions 720 and 730, and protection and re-transmission of frames using ARQ functions 710 and 740.

Figure 8:
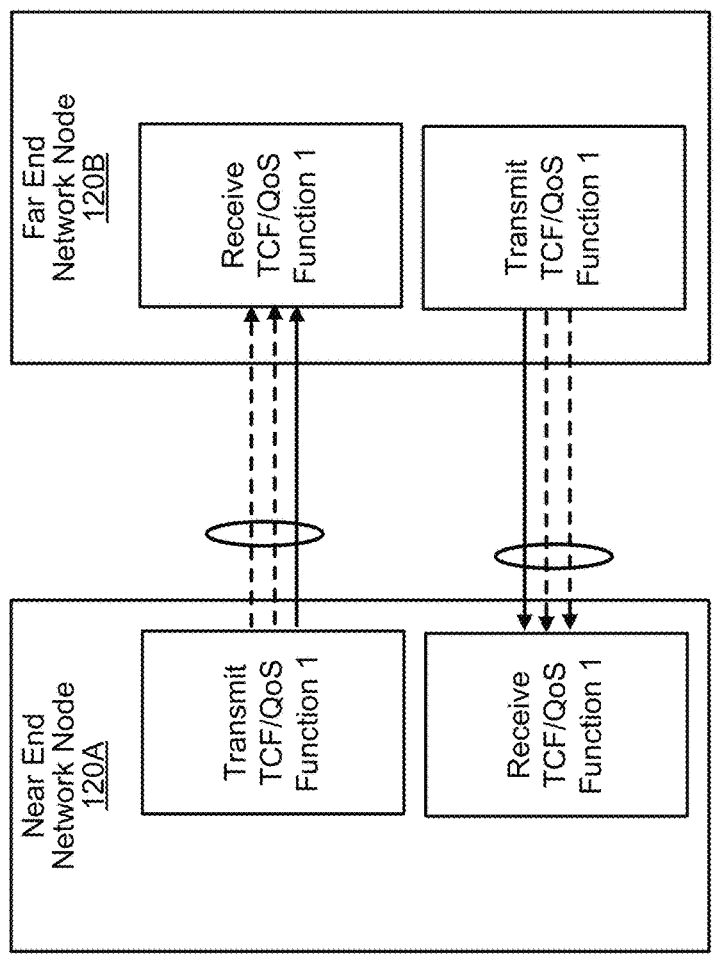
FIG. 8 is a conceptual diagram that illustrates the use of a structured header placed on a data plane frame in a telecommunication network, according to an embodiment.
Figure 8:
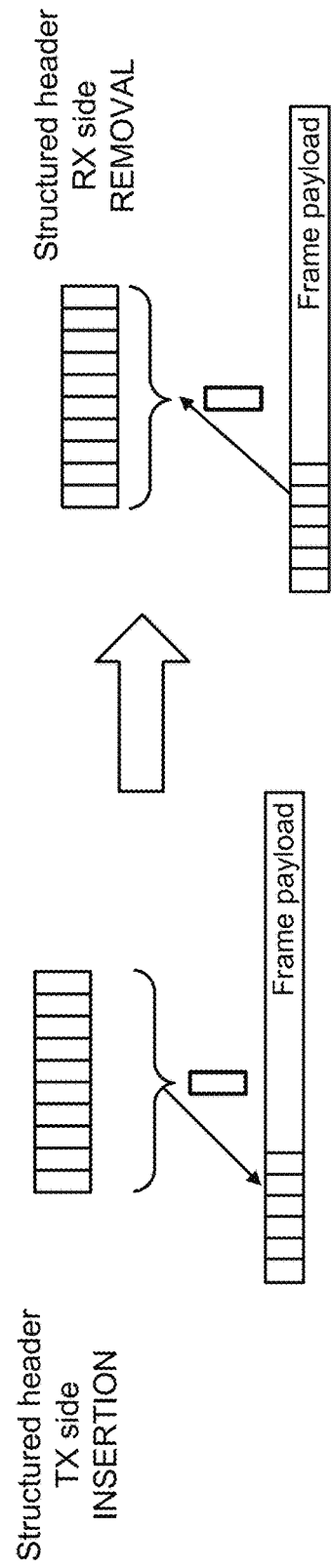

Referring to FIG. 8, network nodes 120 may implement standalone TCFs by using a structured header placed on the data plane frame traffic for mapping or routing the traffic through to the system to the far end node. The structured header may be used by various TCFs for their messaging to their respective far end TCF pair (e.g., ARQ function 710 and ARQ function 740 may identify messages using the structured header). The use of the structured header may be another example of the use of the fast agent 230 in transmitting control plane messages. However, in some embodiments, the structured header may also be used with the slow agent 220 for transmission via the control plane 150. This way a transmission control function such as ARQ can leverage the flow header space to transmit its control frames inside its own reserved space via using a "type" of message, and a structured data field to contain the message. This disaggregates the TCF from the protocol and enables multiple protocols to use the same set of structured headers or service chain data wrapper/marker header to convey control protocol information of different TCFs. One advantage to the data link protocol using the frame headers is the ability to run line rate traffic control and application features over different transport technologies such as FSO (Free Space Optics). Conventionally packet-based control functions in the IP layer cannot correct packet loss at rates below the multi-millisecond threshold. The added capabilities of having a fast path enables sub-millisecond frame loss detection and correction. Coupling this with the capabilities to map user network QoS to the data link layer links and QoS identifiers creates a holistic data link layer framework that can be customized to the customer specific needs versus mitigating the behavior of other data link protocols such as LAG (link Aggregation Group) behavior that lacks fast packet loss correction, and the ability to map QoS across a lag group at will.

A fast agent 230 leverages the reserved header space. By way of example, a structured header may include two sections to encode a frame. The first section may identify a particular flow path of the frame (e.g., the channels used, the ports used, other mapping information) and the second section may identify a particular TCF associated with the frame. Together, the combination of the information of the two sections may identify the level of QoS associated with the frame. Using different combinations of types of frames that may be encoded using the two sections of the header, the network nodes 120 may conduct an ARQ that is specific to each combination. In some cases, the ARQ may also be specific to the type of message. In some cases, the ARQ may be specific to certain subsets of channels of transmission.

The TCFs may use the structured header added to the data plane by the mapping functions 254 as the network traffic flows are mapped to a port and a QoS flow. The structured headers may be inserted at the near end network node 120A and removed at the functional blocks of far end network node 120B the traffic leaves the link or group of logical links. The TCFs may work in this manner as part of any other TCFs, or even Cloud or IoT type protocols that the TCFs are assigned under or part of such as NSF (Network Service Chaining Function headers). The structured header is used to facilitate flow mapping and the transmission flow control functions or other types of TCFs.

The TCFs in some embodiments may be implemented within the data plane and leverage the protocols in the control plane. The data plane functions can be ASIC (application-specific integrated circuits) or software-based. Software-based functions allow the parameters of micro services or software-defined networking data link layer TCFs to be modifiable, whereas a physical chip implementation may be more difficult to be modified. Software upgrades enable new parameters, and trigger (outputs) to be taken from those applications to enable customizable feature sets that are more challenging to implement with static ASIC implementations. The control plane protocol and the TCFs are by their nature dis-aggregated in order that each may be changed and or developed separately yet integrate to each other via a framework schema.

In one embodiment, the network nodes 120 of telecommunication network 110 have configurable parameters such as retransmission windows, maximum buffer depth for re-transmission, and so on that can be changed on the fly, and or selected per path/QoS flow. The configuration of these functions exists in the control layer and may be adjusted by any higher-level function above or in the control plane which also controls flow mappings. In one embodiment, TCFs have both one-sided, and end-to-end capabilities via a network node framework that is available at the control layer.

The particular embodiment shown in FIG. 7 illustrates two examples of TCFs—(1) a replication function that enables multi-path transmissions for higher transmission reliability in wireless and FSO systems; and (2) a modified ARQ that provides data link layer retransmission suitable to address losses that occur in FSO systems. For an incoming control plane message or information data (simply referred to as a message), the message entering a near end network node 120A is classified, treated, and mapped to various channels. The message arrives at a far end network node 120B and in turn mapped, treated, and reclassified back to normal traffic. In transmitting various messages, the network nodes monitor the port status and provide information to the control plane and TCF agents for traffic handling, flow control, and re-configuration in the event of failure.

Figure 9:
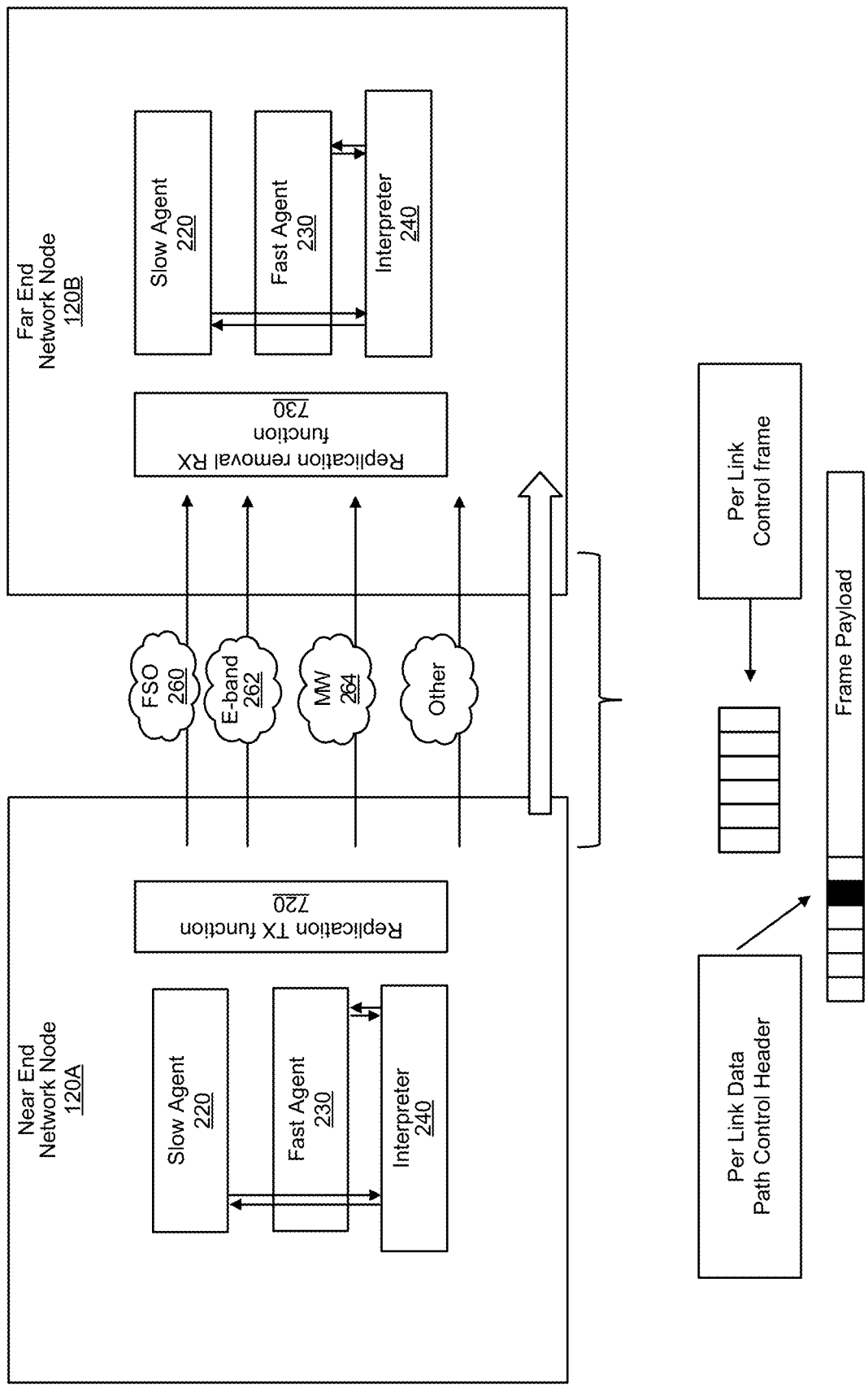
FIG. 9 is a conceptual diagram that illustrates a protocol agent frames per link per path (QoS) use in a telecommunication network, according to an embodiment.
Figure 10:
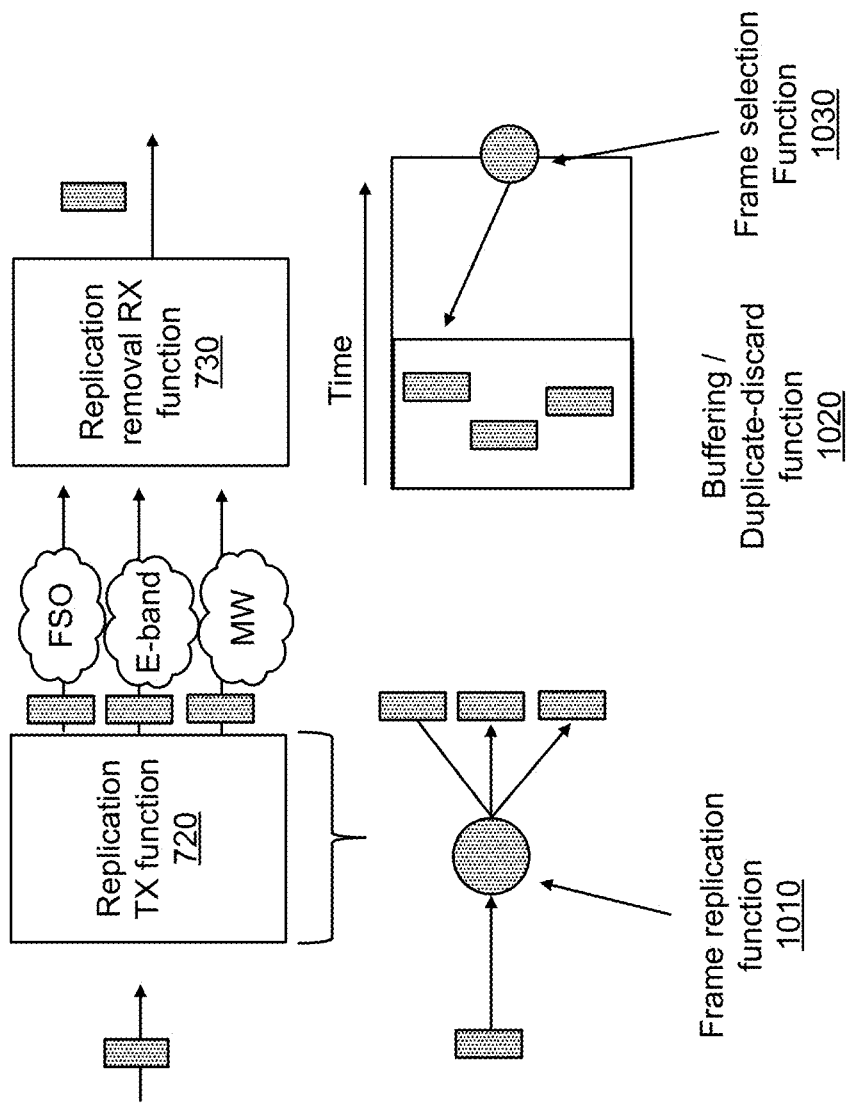
FIG. 10 is a conceptual diagram that illustrates various functions of a replication function in a telecommunication network, according to an embodiment.

FIGS. 9 and 10 are conceptual diagrams that illustrate the replication function, according to an embodiment. The replication TCF may also be referred to as a redundant flow creating TCF. The replication TCF may replicate a frame in the incoming traffic over multiple links (e.g., multiple channels) and may select one of the received frames in the receiving far end if the receiving far end receives more than one replications of the same frame. It is a modified replication transmission and re-combination function that allows traffic protection across multiple transmission media (e.g., replicating the same frame and transmitting them over FSO 260, E-band 262, MW 264). The function may be configured by the control plane agent 210, and can also be dynamically reconfigured by the control plane agent 210 when the performance or transmission rate associated with the port 256 of a transmission medium and/or system state of a link falls below any given threshold, as indicated as the node state engine 246.

The replication TCF replicates the frame flow at the near end and re-combines or selects which replicated frame to transmit at the far end, thereby providing resiliency across more than one link. This function provides the capability to multi-cast over provisioned or configured transmission channel media and automatically resolves which received frame from the set of received multicast frames will be passed on. The replication function can be both dynamic or configurable on the fly.

Referring to FIG. 10, at a near end network node 120A, an incoming message may be classified into at least one of the flow paths that includes a channel and a port. The classification may be based on the QoS requirements and other potential TCF requirements associated with the message. In some cases, the message may be classified into two or more flow paths under the replication TCF. In such a case, a frame may be replicated using a frame replication function 1010 to transmit the replicated frames across two or more channels of different media. For example, each channel may transmit a copy of the same frame. At a far end network node 120B, upon receiving one or more copies of the frame, may first buffer the received frames at buffering/duplicate-discard function 1020. The far end network node 120B may select one of the copies of the frame using frame section function 1030 based on one or more criteria set by the telecommunication network 110. For example, the frame section function 1030 may select the copy of the frame that is first received and that passes cyclic redundancy check. Other criteria may also be used.

The replication TCF utilizes the same state and system framework as other TCF's available in a network node 120. For example, in one embodiment, the primitive and lower level protocol and function state are located in the data plane agent 242, while other states from other TCFs, ports, and mappers are located in the control plane agent 210.

Figure 12:
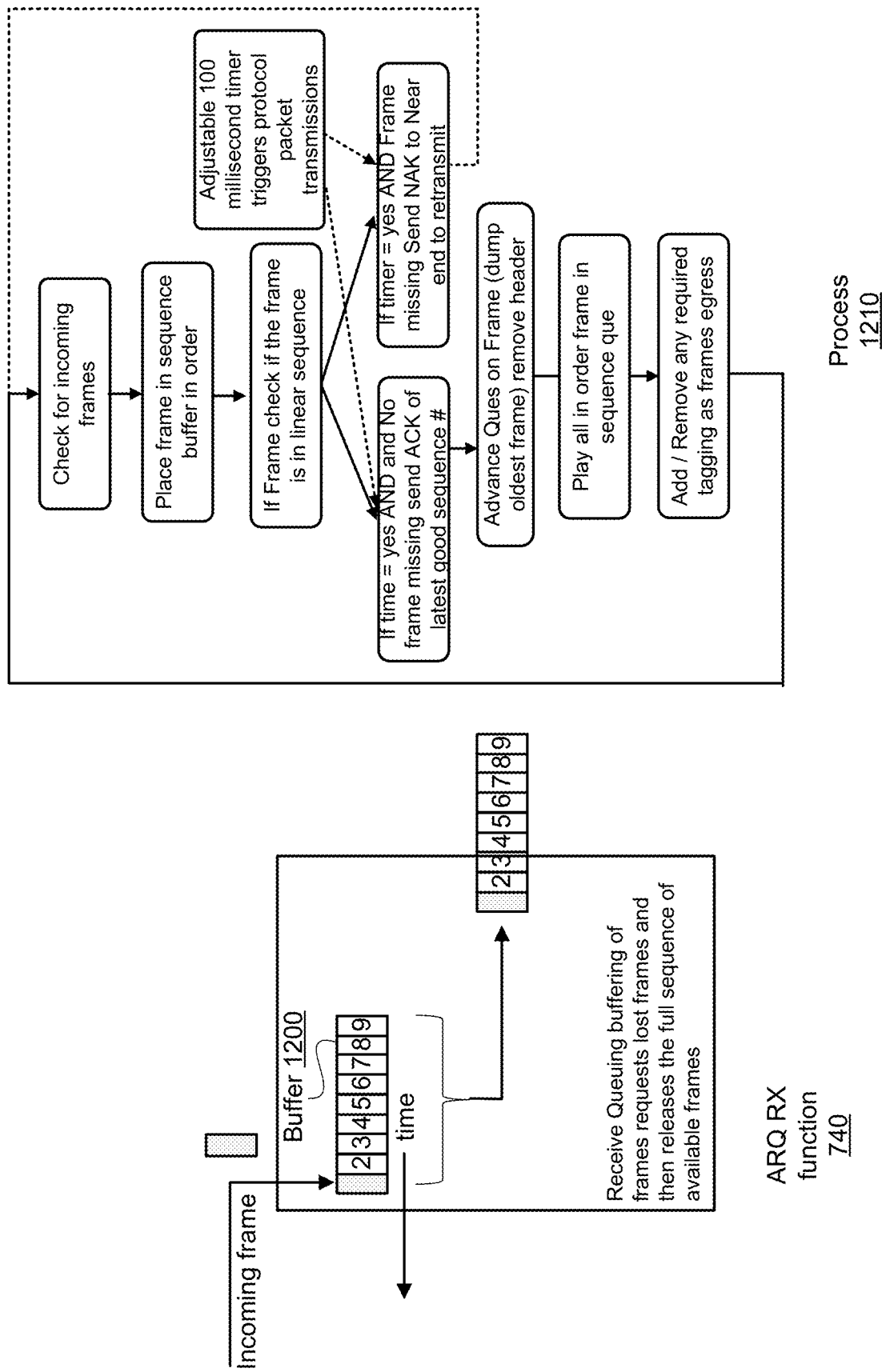
FIG. 12 is a conceptual diagram illustrating the modified ARQ receiving function in a telecommunication network, according to an embodiment.

FIG. 11 is a conceptual diagram illustrating ARQ transmitting function 710, according to one embodiment. FIG. 12 is a conceptual diagram illustrating ARQ receiving function 740, according to one embodiment. Collectively, the ARQ transmitting function 710 and the ARQ receiving function 740 may be referred to as ARQ TCF. The ARQ TCF handles detects sequenced frame loss and requests retransmission of lost frames during a set retransmission parameter. The ARQ TCF observes received frame sequences at the far end and requesting retransmission of those specific frames. The ARQ TCF buffers transmitted and received frames at buffers 1100 and 1200 for a period in order to store and re-order frames. The ARQ TCF may occur at the Ethernet data link layer (e.g., a data link layer that is under the Ethernet standard) with control frames moving in the microsecond domain in order to repair transmission loss before the higher layers (e.g. IP layer) can detect and address them. The ARQ TCF has, but is not limited to, features such as buffer window size or depth, and packet reordering on/off.

As depicted in FIGS. 11 and 12, both near end and far end network nodes 120A and 120B may have a buffer depth parameter that can be custom designed to address the transport speed coupled with round trip latency signaling which requires configurable buffer depths not available in aggregation link layer control other transmission technologies. Process 1110 implemented by ARQ transmitting function 710 may utilize a receive function where the sequential frames are released up to the last good frame and occur at line rate unlike other data link layer functions. The ARQ TCF may also perform queue or buffer maintenance at line rate, which is also shown in both the processes 1110 and 1210. This line rate (sub-millisecond) operation in the data link layer allows network nodes 120 to address transmission control functions such as re-transmission which are typically at other layers of the OSI model. The ARQ TCF enables the ARQ function to be used across logical links of varied types (e.g., the types may be indicated by different combinations of structured headers), which are not possible with physical layer retransmission. The ARQ TCF may also allow high-speed re-transmission which the higher layers (e.g., IP, TCP) cannot provide.

The two example TCFs (ARQ TCF and replication TCF) act as micro services under the interpreter 240 with the mapping functions 254 allows the interpreter 240 to map any flow to a path at a QoS level, and to add or drop one or both TCFs at will with little or no traffic impacts. In one embodiment, the end result of this capability may be a fully customizable TCF or QoS treatment based on Traffic type (that is mapped into a path and flow),
ARQ on/off, and parameters thereof,
Replication on/off, number of redundant flows, and which links (e.g., channel media)
Uplink QoS (8 levels across each port)

The network management system 130 also enables a data link protocol flow (e.g., ports and channels) to be provisioned to the agents at will. In one embodiment, each link may be dedicated to one of the following provisioning types.

Dedicated
Load balancing
Hybrid partially dedicated/partially load balancing

This function may be part of the configuration of logical ports and paths done in the network management system 130, and control plane 150 that is implemented by the (uplink) mapping function of the system.

The adaptability of telecommunication network 110 may be enabled by the framework 200 described in FIG. 2, where the network management system 130 can dynamically configure, add and/or remove TCF's (e.g., ARQ), and any other application, or function from the data plane mapping via re-configuring the mapping elements, and the setting in the interpreter 240, and flows between the ends of the link. This enables the framework to host Cloud functionality as part of the protocol, as well as SDN, IoT, AIN, Machine Learning, and AI. Each of these services may place their functions into the system distributed along the transmission path and use the control plane agents 210 to convey and operate the end-to-end functions or applications that are not entirely traffic control related. The framework 200 described in FIG. 2 may be extended to support new functions, and the signaling is mapped to a path (e.g. fast or slow) that is suited for its requirements.

Referring back to FIG. 7, in one embodiment, the ARQ TCF and replication TCF are combined to provide a highly resilient, and robust telecommunication system (which may include FSO system) that transmits frame across one or multiple links, with ARQ TCF which corrects very short duration (configurable) frame loss. For example, in one embodiment, a first network node 120A receives or generates a message. The first network node 120A may receive the message when the message is transmitted form another network node 120. The message may also be originated from the first network node 120A. The message may be a control plane message that changes a setting of the telecommunication network 110. The first network node has the capability of transmitting data via a plurality of channels of different media under one of a plurality of flow paths and under one of a plurality of QoS requirements. The channels between the first network node and a second network node may be regulated across by an ARQ, such as the ARQ TCF.

The first network node 120A generates a message that may be inserted into a control plane frame or a data plane frame. The frame may be in compliance with format of the data plane 160 or the control plane 150. The frame includes the message and a marking (e.g., a header) encoding that the frame carries the message. The frame may be associated with a first QoS requirement. The first network node replicates the frame to generate copies of the frame under the replication TCF. In one case, under the replication TCF, the first network node 120A transmits the frame via at least two of the channels under a first instance of the ARQ. Each instance of the ARQ may be identified by a specific combination of the structured header. Each channel of the at least two of the channels transmits a copy of the frame. In one embodiment, the copies of the frame that are transmitted via different channels are regulated under the same first instance of the ARQ. In contrast, other frames associated with a different QoS requirement are regulated under a different ARQ instance.

The second network node 120B receives one or more copies of the frame that are respectively transmitted from a different channel. The second network node 120B selects one or more of the received copies to extract the message. Upon a successful receipt of at least a copy of the frame, the second network node 120B may transmit a positive acknowledgment specific to the first instance of the ARQ to the first network node 120A. In combining the ARQ TCF and replication TCF, various features discussed in FIG. 8 through FIG. 12 may be used. For example, in one embodiment, unacknowledged sequential frames associated with the first instance of the ARQ are stored in a buffer (e.g., buffer 1100) and are released upon a receipt of an acknowledgment specific to the first instance.

Figure 13:
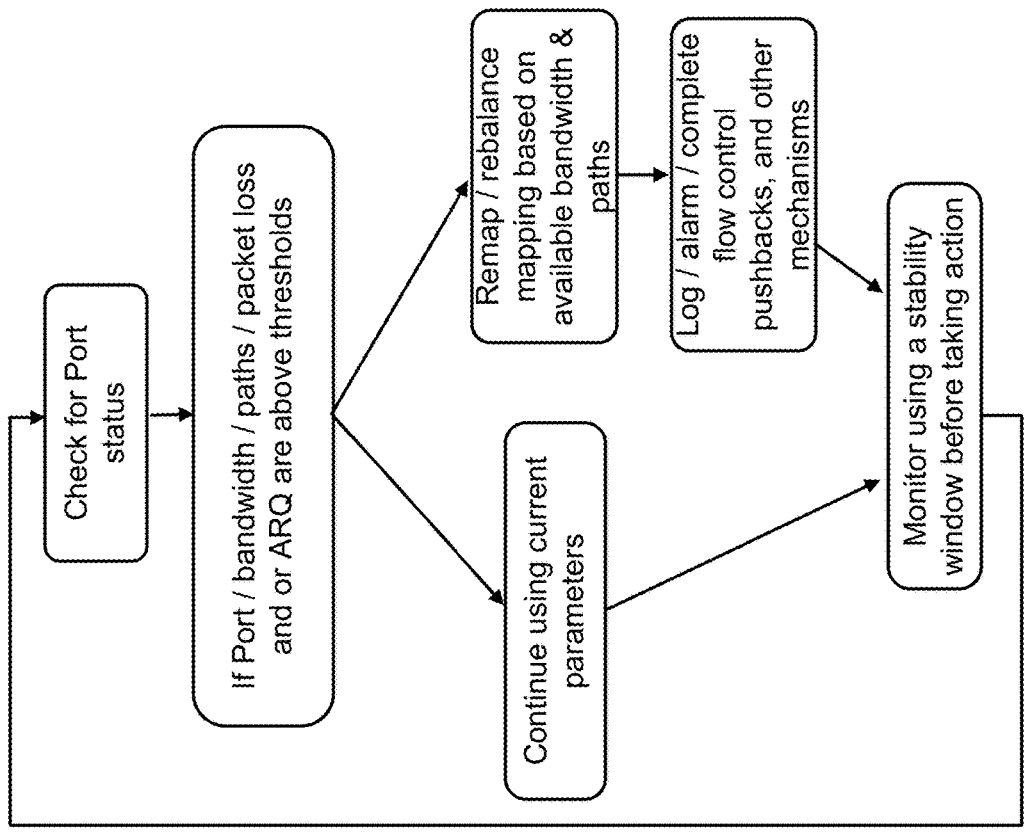
FIG. 13 is a flowchart depicting a process of a network node that performs mapping and classification in a telecommunication network, according to an embodiment.

In implementing one or more TCFs, a network node 120 may monitor the state information of various ports and channels, as illustrated in FIG. 6. A network node 120 may perform mapping and classification based on a process 1300 as depicted in FIG. 13. The network node 120 may continually track port states and take actions when a port leaves the active state. For example, a near end network node 120A may select two or more channels under the replication TCF based on states of ports corresponding to the channels. The network node 120 may modify the mapping, flow allocations, and other configurations of various TCFs based on the states of various ports and channels.

Example Management of Telecommunication Network

Referring back to FIGS. 1 and 2, the network management system 130 provides various methods (e.g., via user interface 132 and API 134) for a network administrator to manage, customize, and adjust various QoS treatments and settings, including parameters and the code in the classification functions 250, TCFs 252, and mapping function 254 to adjust the functioning of interpreter 240, control plane agent 210, and data plane agent 242. The network nodes 120 in the telecommunication network 110 may be configured by the network management system 130 (NMS), which may also be referred to as an element management system, through propagation of control plane messages (e.g., OAM messages), which could carry data link layer settings, higher layer settings, or non-network protocol settings. The framework 200 shown in FIG. 2 provides a structured resource schema to allow the TCFs and other functions in a network node to be "hot modifiable" by enabling any TCFs 252 to use the reserved header space of type and payload in the fast agent header 402, or have its own control plane messages via the slow agent frames 420.

The network management system 130 provides the user interface 132 and API 134 to present a structured menu and resource schema that allows a network administrator to design their own QoS from three settings: (1) network flow classifications, (2) traffic control functions, and (3) path channel and QoS treatment options. The first setting regarding network flow classifications specifies at least rules to select one or more of the following: a port, a virtual local area network (VLAN), a port control protocol, or a differentiated services code point. The second setting regarding traffic control function specifies rules to select one or more of the following: a type of ARQ to be used, multiplexing protocol to be used, or throttling protocol to be used. The third type of setting regarding path channel and QoS treatment options specifies rules to determine one or more of the following: a selection of one or more channels, or a selection between data plane and control plane. The settings are customizable by the network administrator to provide a pallet for the network administrator to design their own implementation of specific QoS treatment that can be distinct from traditional standard QoS models.

The network management system 130 may receive, from a telecommunication network administrator device 142, messages containing the first setting, the second setting, and/or the third setting. The network management system 130 may propagate the first, second, and third settings to a plurality of network nodes 120 of the telecommunication network 140 through one or more control plane messages. For example, the network management system 130 may transmit a control plane message to one or more network nodes 120. The one or more network nodes 120 may further distribute the control plane message to other network nodes 120. The transmission of a control plane message may be via a data plane frame or a control plane frame, as discussed in FIG. 4. In some embodiments, one or more settings may be global to every network node 120 in the telecommunication network 110. In other embodiments, some of the settings may be localized within a certain subset of network nodes 120.

The propagated settings may decide how a new frame for incoming traffic is transmitted. For example, a first network node 120 may receive a frame and mapping information associated with the frame. The first network node 120 may determine, based on the mapping information and the first, second, and third settings, to use one or more channels to transmit the frame and use one or more TCFs in association with the frame. The determination of the channels to transmit a frame may also depend on the states of ports. For example, the first network node 120 may receive information of states of ports of the first network node 120 corresponding to different channels and use the state information to determine the channel(s) of transmission. For a second frame that is different from the first frame, the first network node 120 may receive second mapping information associated with the second frame. The first network node 120 may determine, based on the second associated mapping information and the first, second, and third settings, to use a second TCF in association with transmitting the second frame. The second TCF may be different from the TCF used in transmitting the first frame.

The network management system 130 may also include an event and messaging function or service. Resources in a network node 120 (e.g., ports, channels, various agents) may have different states. The node state agent 242 may monitor those states. Based on the information transmitted by the node state agent 242 as control plane messages to the network management system 130, the network management system 130 may send alarms, emails, and or log events automatically or in response to a request from the telecommunication network administrator device 142. For example, the network management system 130 may notify an operator of one of the channels regarding the state of the port associated with the channel or the transmission rate of the channel.

The network management system 130 may leverage the framework 200 described in FIG. 2 to enable a network administrator to fully customize the QoS treatment of flows. FIG. 5 shows a configured flow pattern where the network management system 130 and node agents (e.g., control plane agent 210) have been configured to classify traffic or flow based on data frame ports and headers. A control plane agent 210 may map a message into TCFs and then to the link (FSO, RF, . . . ) to the far end. The data plane exists between the incoming classifier function and the link mapping function and may include TCFs that can be added or removed to the flow at will. This includes choosing one or more link channels (FSO only, FSO and E-band, E-band only, etc.). This combination of identification of flow for "transmission treatment" and TCF treatment provides an extensive configurable QoS capability that does not exist conventionally. This capability turns a data link layer control plane into a service function.

Figure 15:
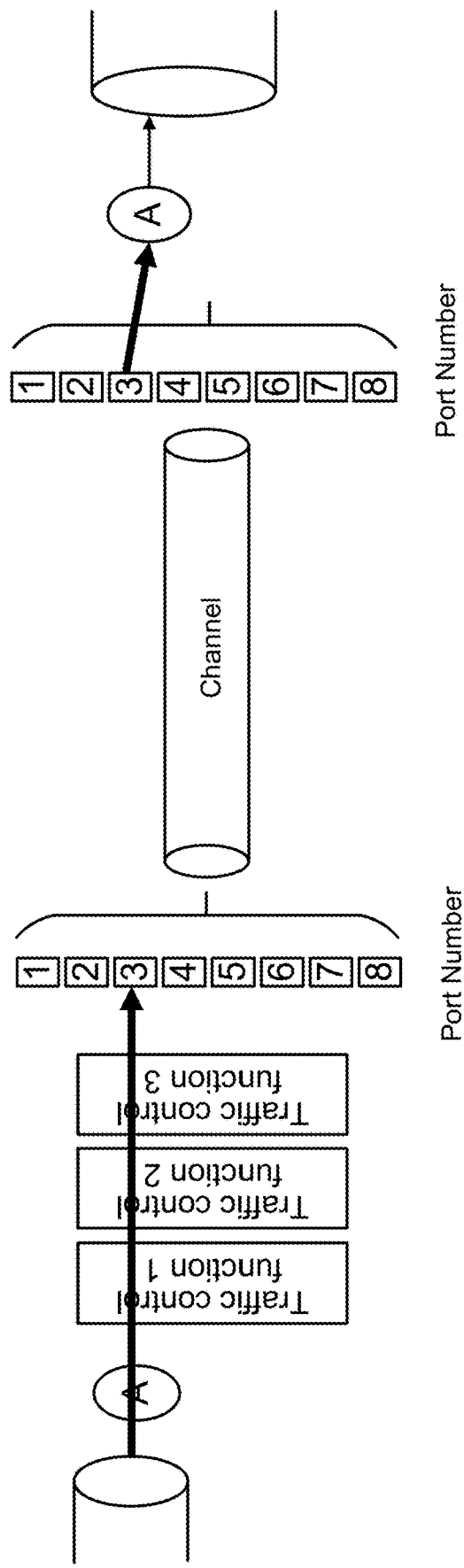
FIG. 15 is a single flow view that may be presented at a graphical user interface, according to an embodiment.

FIG. 14 is a conceptual diagram depicting an example user portal that may be presented at user interface 132 that includes the functions and parameters within the control plane 150, according to one embodiment. The user interface 132 may take the form of a graphical user interface (GUI) that shows a mapping of the first, second, and third settings regarding (1) network flow classifications, (2) traffic control functions, and (3) path channel and QoS treatment options. The GUI may present the correlations in a tabular form 1400 that correlates directly to the classification of incoming flows, transmission treatments, TCFs, and other parameters inside the TCFs. The GUI allows a network administrator to add, remove, or adjust one or more settings to the telecommunication networks and the change in the settings will be converted to one or more control plane messages to be propagated to the telecommunication network 110. The GUI may also present a system view of the telecommunication network 110 so that the system view can present faults and performance threshold alarms (e.g., state information obtained from node state engine 246) to alert conditions of the telecommunication network. FIG. 15 may be a single flow view of a GUI if a network administrator clicks on the table 1400 shown in FIG. 14 to display a flow entry. The flow may be provisioned via various network resources and be represented graphically of the service chain in the data link layer. The resource assigned attributes in the network management system 130 and the control plane agent 210 can be polled to provide this graphical representation.

Figure 16:
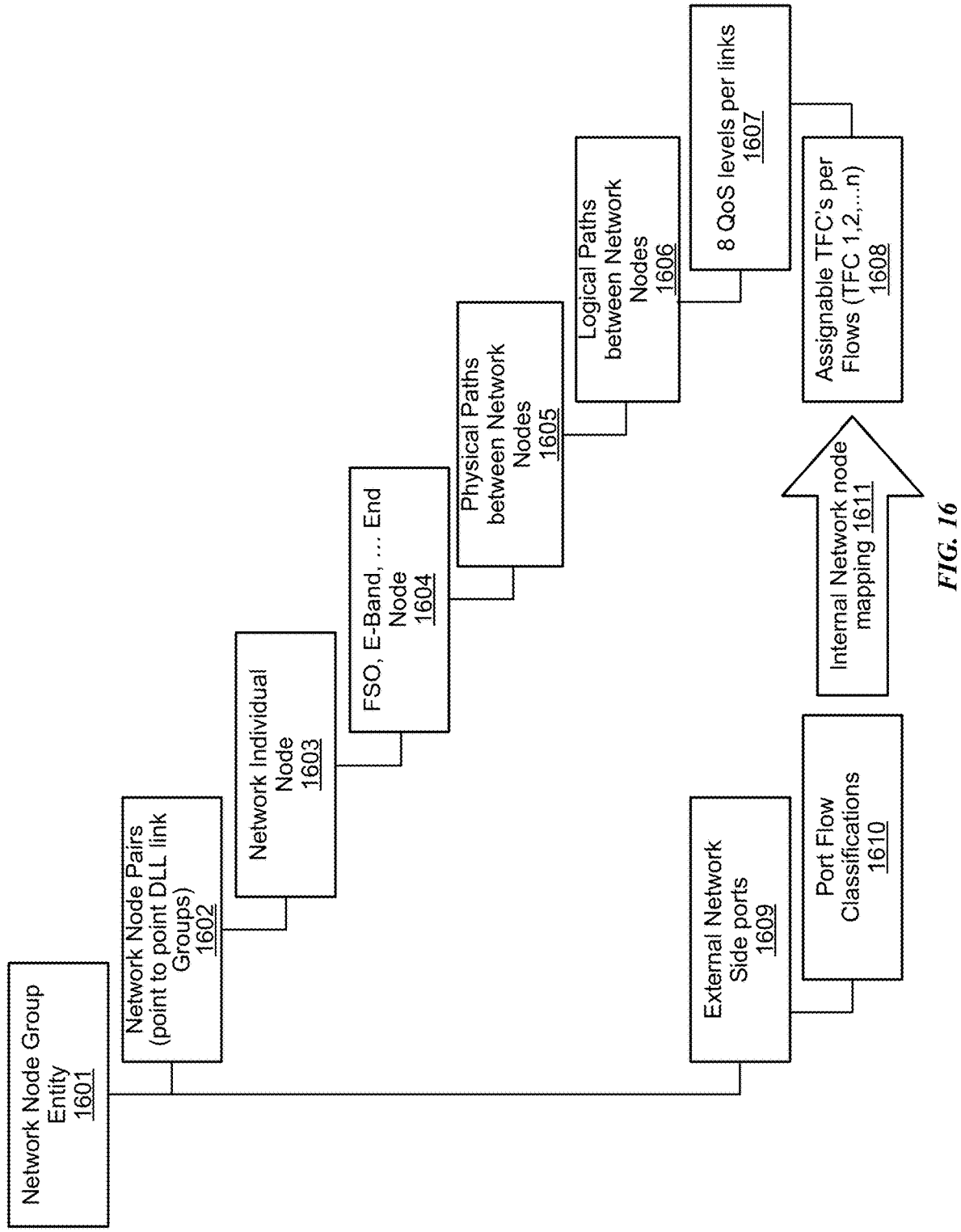
FIG. 16 is a block diagram that depicts a resource model of a telecommunication network, according to an embodiment.

FIG. 16 is a block diagram that depicts a resource model of a telecommunication network 110 that shows the subclass resources that provide the overall framework of the telecommunication network 110, according to an embodiment. The class diagram shows the cluster of network nodes, which map down to the individual transmission link facility (e.g., a port and a channel) and QoS treatment levels as mappable resources. The second part of the tree is the incoming network classification resources, which are mapped by the control plane 150 to the link QoS resources via configuration in the control plane 150.

Figure 17:
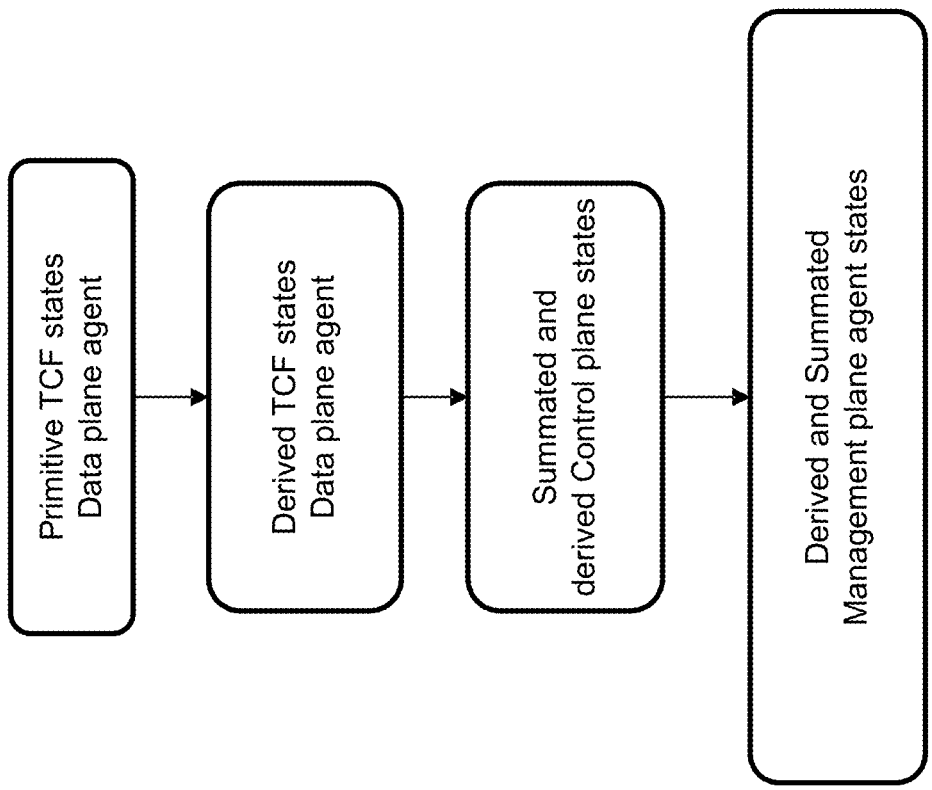
FIG. 17 is a flowchart depicting various state information used by levels higher than the data link layer, according to an embodiment.

FIG. 17 is a flowchart depicting various state information used by higher levels and/or externals programs that may be located in data plane or control plane, according to an embodiment. The ARQ TCF and other TCFs discussed in FIG. 7 may contain primitive protocol measurements and states at the data plane level and speed. A network node 120 tracks port and system states, cross TCF states, and derived states. The control plane agent 120 tracks overall configuration and state. The replication TCF may utilize the same state and system framework as other TCFs where the primitive and lower level protocol and function state are located in the data plane portion of the agent, other states form other TCFs, ports and mappers are located in the control plane agent 210.

Example Chassis and Multi-Chassis Implementation

Figure 18:
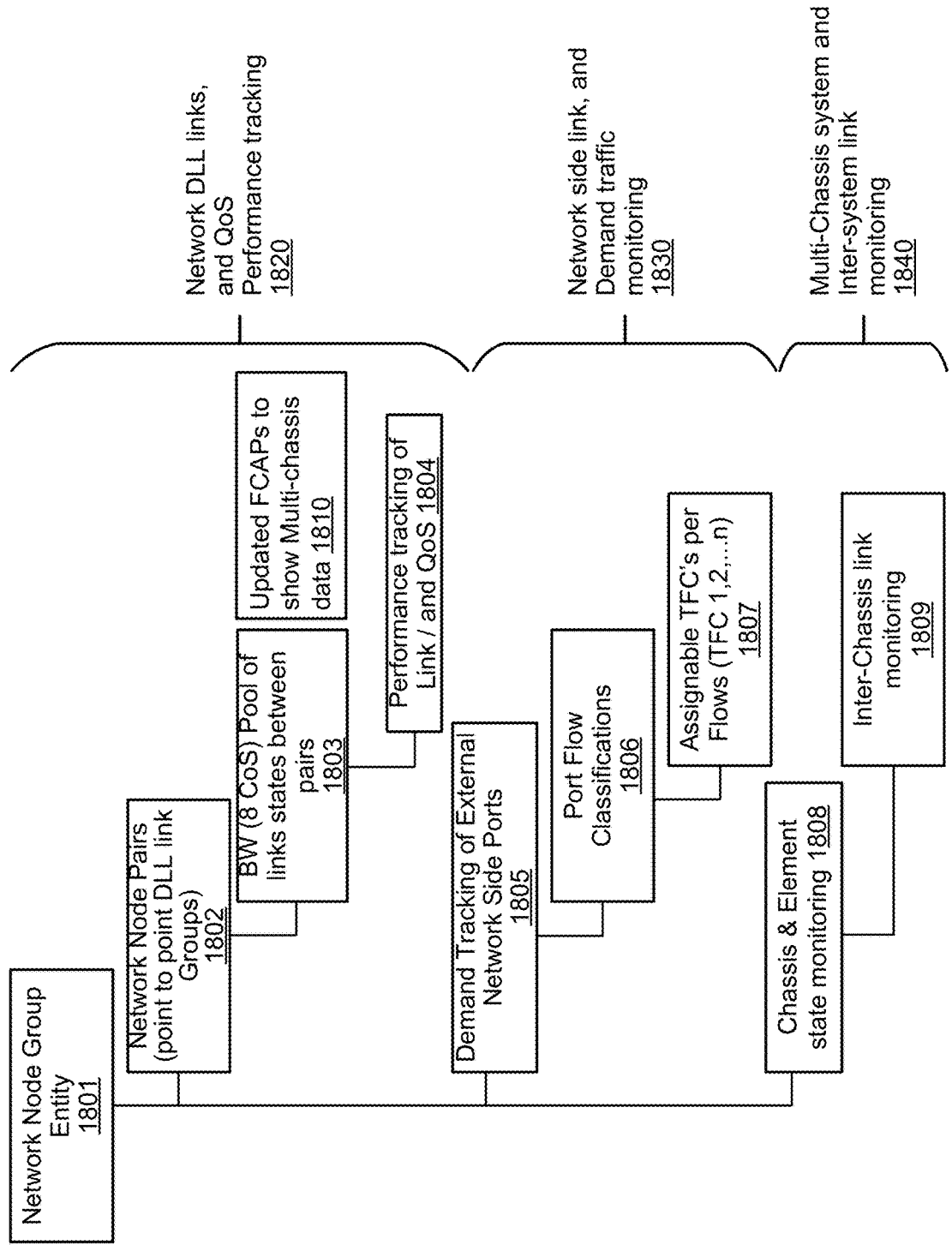
FIG. 18 is a block diagram that depicts a resource model of a multi-chassis mode of a telecommunication network, according to an embodiment.
Figure 19:
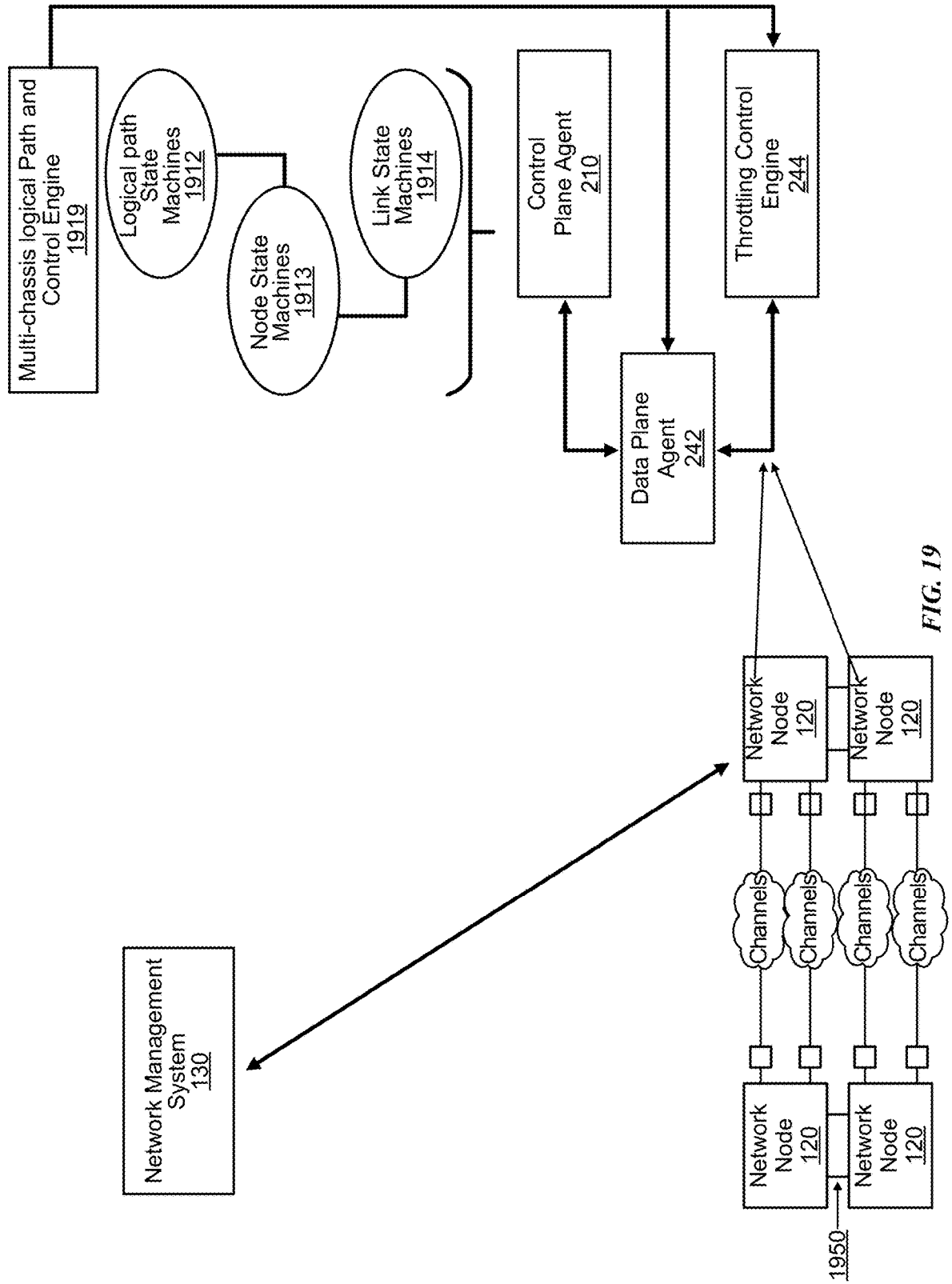
FIG. 19 is a block diagram that illustrates a multi-chassis bandwidth monitoring and health functions in a telecommunication network, according to an embodiment.
Figure 20:
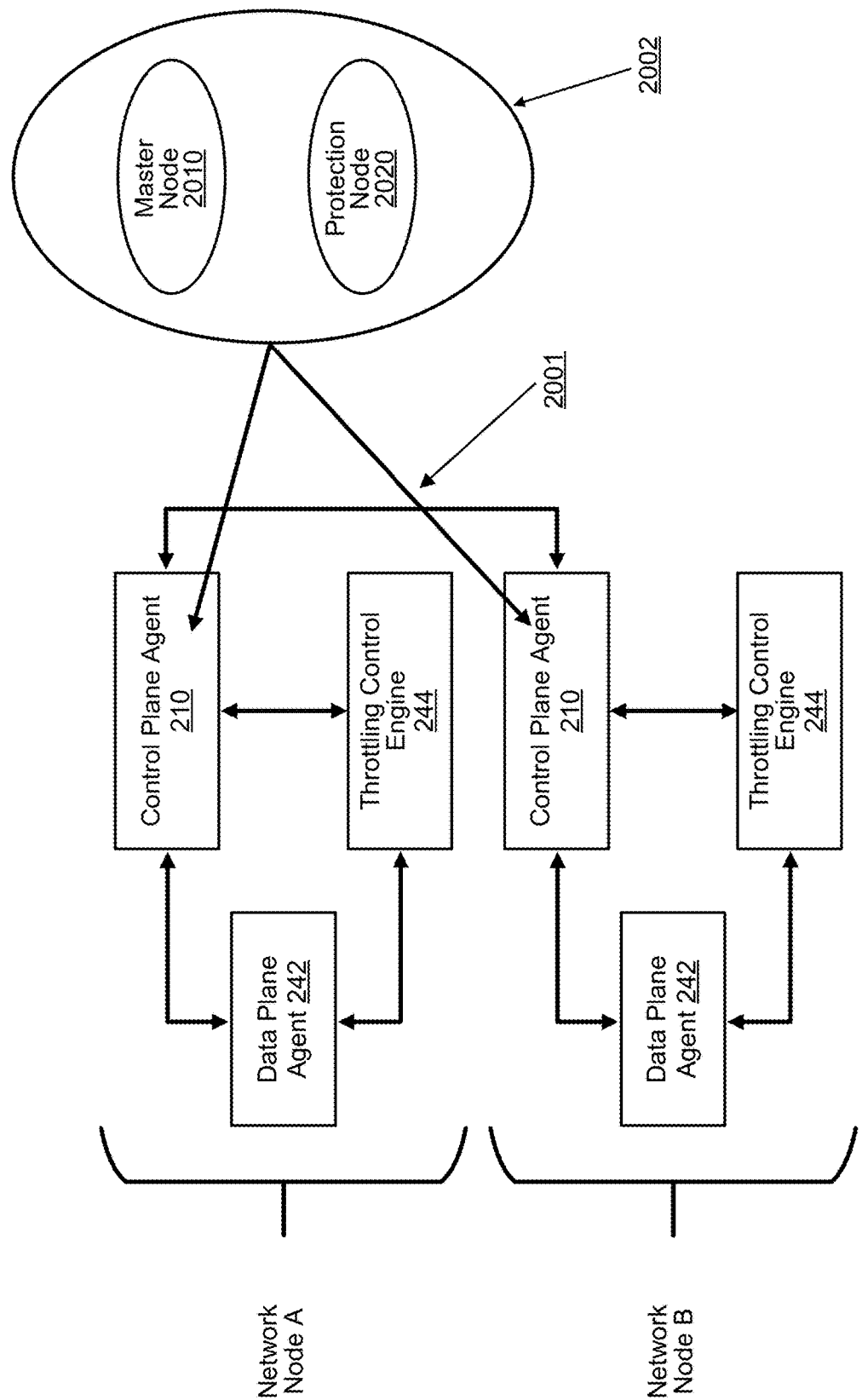
FIG. 20 is a block diagram that illustrates a multi-chassis system with operational state engines between network nodes that track input modification in a telecommunication network, according to an embodiment.

FIG. 18 is a block diagram that depicts a resource model of a telecommunication network 110 for a multi-chassis approach for one or more network nodes 120, according to an embodiment. FIGS. 19 and 20 are block diagrams illustrating a multi-chassis protection implementation schema. FIG. 18 shows groups of data tracked by each agent and shared across multi-chassis agents for triggering changes in the master versus protection mode of that agent, which will be further illustrated in FIG. 20. FIG. 20 shows a multi-chassis system with congestion or audit input modification to single chassis inventory and FCAPS (fault, configuration, accounting, performance, security). In level 1820, it is related to a node inventory view of the system when multi-chassis makes network nodes 120 appear as logical entities. In level 1830, it shows network side inventory. In level 1840, it shows local node representations.

FIG. 19 shows the multi-chassis bandwidth monitoring and health functions that trigger changes in provisioning for multi-chassis protection, QoS mapping, and TCFs across the links and network nodes. Multi-chassis logical path and control engine 1919 may be a bandwidth control engine. Logical path state machine 1912 may track the state of the nodes. The node state machines 1913 may turn a node into a master mode or a protection mode. The link-state machines 1914 may provide channel and port state information and act as a state machine. Link 1950 may provide fail to by-pass links whereby the network nodes 120 may automatically passes all traffic on incoming ports to the by-pass links when a failure occurs and bypassing failed facility in terms of traffic flow via the links between two network nodes 120 to provide fail-over functionality.

FIG. 20 shows the function locations in the control plane that performs the agent to agent negotiations, and provisioning of which network node is the master mode 2010, and which node is in the protection mode 2020. There can be multiple protection schemas. The network management system 130 may monitor the data link layers, channels, and QoS and TCFs in order to make re-configuration changes in a multi-chassis environment. The paired or end-to-end node changes may be communicated either by the agent pairs direction or by the user interface 132. This setup allows the master or protection node status to be changed proactively to perform hitless hardware, and software upgrades. A master node 2010 may be used to control the protection node 2020 in transmitting data and in carrying out replication TCF, etc.

The multi-Chassis functionality is provided using the traditional fail to close port function with inter-chassis links so that when a network node 120 fails due to power and/or other administrative or operational changes, the incoming traffic is mapped to another node. The situation may be referred to as failure-to-close state. Two network nodes could be part of a single chassis and still operate in a protected chassis mode. A control plane agent 210 may act in the master mode or protection mode and copy all the provisioning data from both nodes. The control plane agents 210 checks each other's states, and can be forced from one node to the other. In some embodiments, both nodes cannot be in the same state at the same time. The control plane agents 210 perform checks with the opposing node, and the far end nodes prior to changing states.

Figure 21:
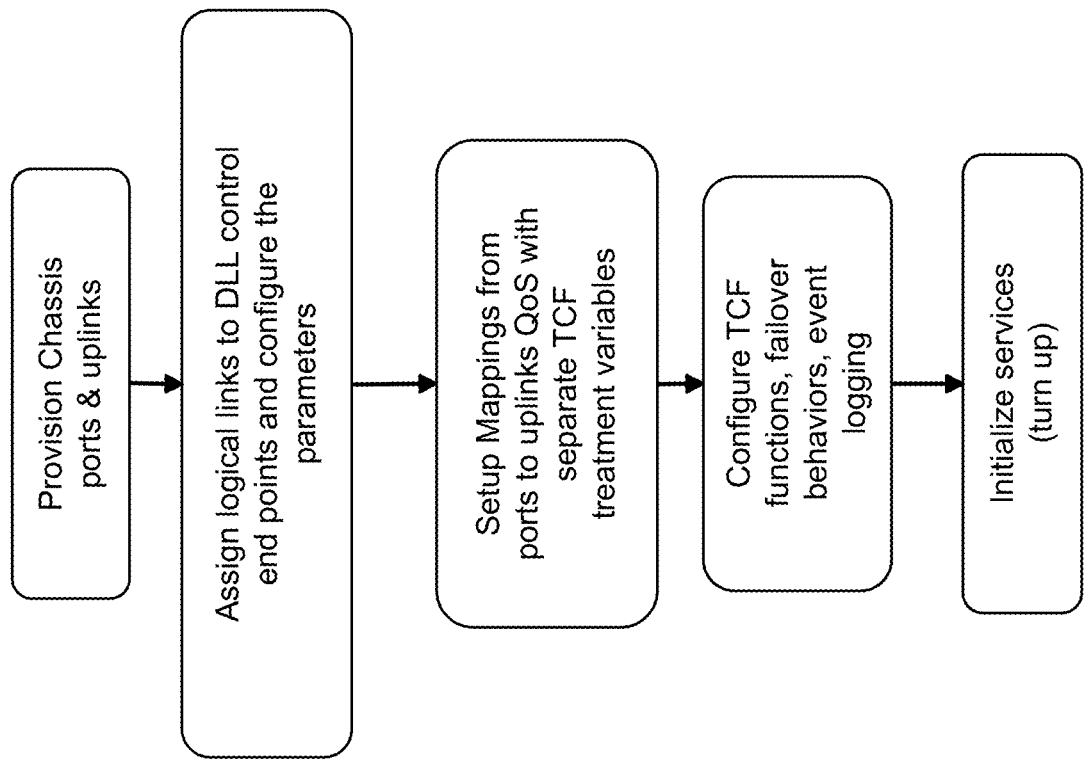
FIG. 21 is a flowchart depicting a process of turning up a network node in a telecommunication network, according to an embodiment.

FIG. 21 shows a process of turning up a network node 120, according to an embodiment, whether the network node 120 is to be operated in a single or multiple chassis mode. In turning up a network node, the links are configured and present (in inventory) on the network node 120 to enable assignments of data link layer flows across the link or group of links. A network node 120 also may have parameters for triggering applications and/or events to notify other systems of the turning up.

Computing Machine Architecture

Figure 22:
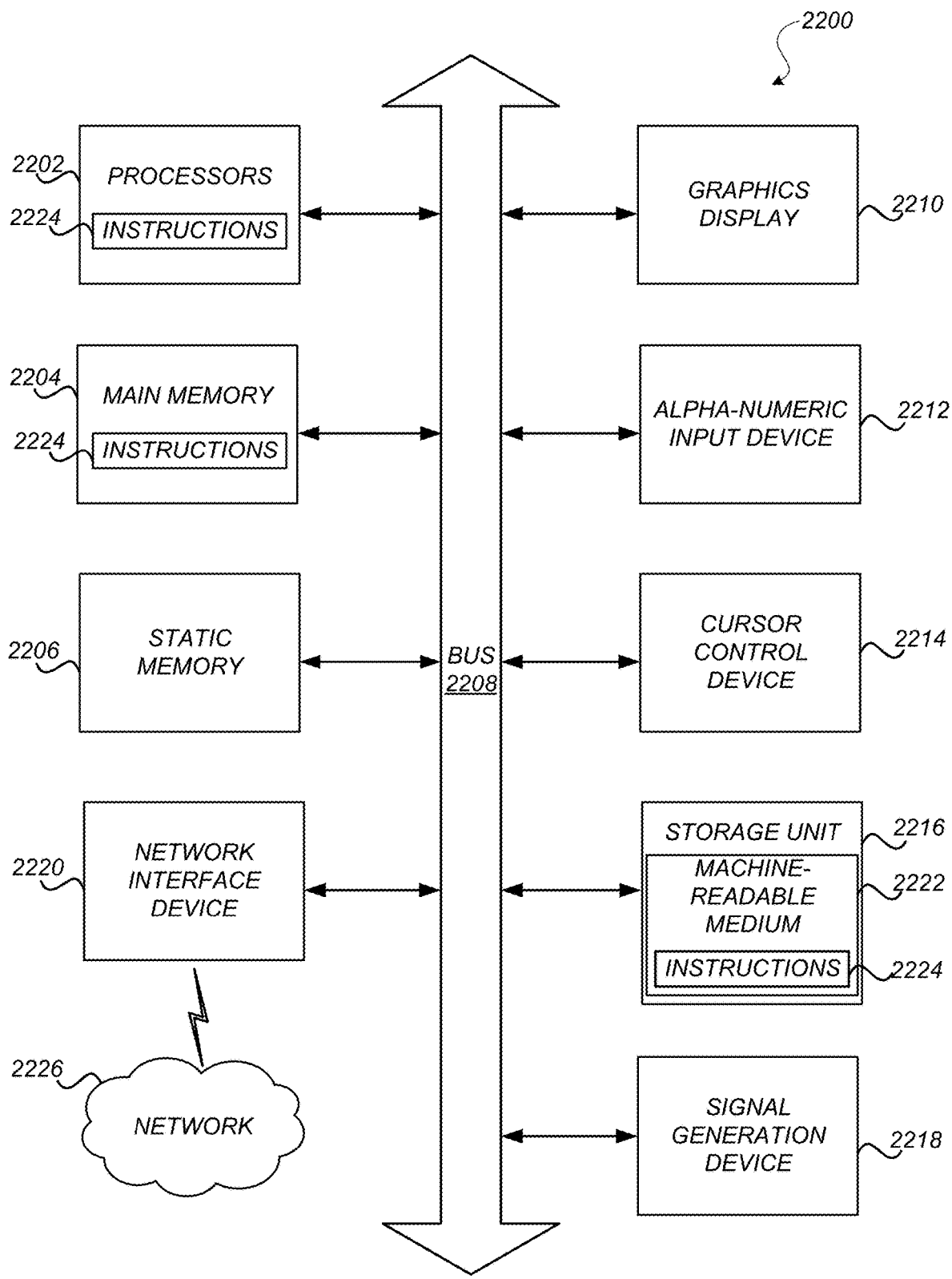
FIG. 22 is a block diagram illustrating components of an example computing machine, according to an embodiment.

FIG. 22 is a block diagram illustrating components of an example computing machine that is capable of reading instructions from a computer-readable medium and execute them in a processor (or controller). A computer described herein may include a single computing machine shown in FIG. 22, a virtual machine, a distributed computing system that includes multiples nodes of computing machines shown in FIG. 22, or any other suitable arrangement of computing devices.

By way of example, FIG. 22 shows a diagrammatic representation of a computing machine in the example form of a computer system 2200 within which instructions 2224 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 22 may correspond to any software, hardware, or combined components shown in FIGS. 1 and 2, including but not limited to, the telecommunication network administrator device 142, the network management system 130, and various engines and agents shown in FIG. 2. While FIG. 22 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 2224 that specify actions to be taken by that machine. Further, while only a single machine is illustrated, the term "machine" and "computer" may also be taken to include any collection of machines that individually or jointly execute instructions 2224 to perform any one or more of the methodologies discussed herein.

The example computer system 2200 includes one or more processors 2202 such as a CPU (central processing unit), a network processing unit (NPU), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 2200 may also include a memory 2204 that store computer code including instructions 2224 that may cause the processors 2202 to perform certain actions when the instructions are executed, directly or indirectly by the processors 2202. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 2202 and reduces the space required for the memory 2204. For example, the processing techniques described herein may reduce the complexity of the computation of the processors 2202 by applying one or more novel techniques that simplify the steps in generating results of the processors 2202. The processors described herein also speed up the processors 2202 and reduce the storage space requirement for memory 2204.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 2200 may include a main memory 2204, and a static memory 2206, which are configured to communicate with each other via a bus 2208. The computer system 2200 may further include a graphics display unit 2210 (e.g., a plasma display panel (PDP), a liquid crystal display (LCD), a projector, or a cathode ray tube (CRT)). The graphics display unit 2210, controlled by the processors 2202, displays a graphical user interface (GUI) to display one or more results and data generated by the processes described herein. The computer system 2200 may also include alphanumeric input device 2212 (e.g., a keyboard), a cursor control device 2214 (e.g., a mouse, a trackball, a joystick, a motion sensor, or other pointing instrument), a storage unit 2216 (a hard drive, a solid state drive, a hybrid drive, a memory disk, etc.), a signal generation device 2218 (e.g., a speaker), and a network interface device 2220, which also are configured to communicate via the bus 2208.

The storage unit 2216 includes a computer-readable medium 2222 on which is stored instructions 2224 embodying any one or more of the methodologies or functions described herein. The instructions 2224 may also reside, completely or at least partially, within the main memory 2204 or within the processor 2202 (e.g., within a processor's cache memory) during execution thereof by the computer system 2200, the main memory 2204 and the processor 2202 also constituting computer-readable media. The instructions 2224 may be transmitted or received over a network 2226 via the network interface device 2220.

While computer-readable medium 2222 is shown in an example embodiment to be a single medium, the term "computer-readable medium" should be taken to include a single medium or multiple media (e.g., a centralized or distributed database, or associated caches and servers) able to store instructions (e.g., instructions 2224). The computer-readable medium may include any medium that is capable of storing instructions (e.g., instructions 2224) for execution by the processors (e.g., processors 2202) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method for operating a telecommunication network having a data plane and a control plane, the method comprising:
   receiving or generating, at a first network node, (i) a control plane message that belongs to the control plane and (ii) mapping information associated with how the control plane message should be transmitted, wherein the first network node comprises a first agent and a second agent;
   determining, based on the mapping information, whether the control plane message is to be sent via the first agent or the second agent;
   transmitting, responsive to determining that the control plane message is to be sent via the first agent, a data plane frame, wherein transmitting the control plane message under the first agent comprises injecting the data plane frame into a traffic of data payload frames, the data plane frame carrying a version of the control plane message and having a marking signifying that the data plane frame carries the control plane message; and
   generating, responsive to determining that the control plane message is to be sent via the second agent, a message frame that encapsulates the control plane message, wherein the message frame is transmitted by the second agent via the control plane or via the data plane during a lapse of data plane traffic.

2. The method of claim 1, wherein the version of the control plane message is an encoded message that fits a section of the data plane frame's header and the data plane frame carries the version of the control plane message in the section of the data plane frame's header.

3. The method of claim 1, further comprising:
receiving, at a second network node, a plurality of frames transmitted via the first agent;
determining that one of the received frames including the marking as the data plane frame encoding the control plane message;
returning the control plane message to a part of a flow of the control plane based on the mapping information; and
determining that at least one of the other frames of the plurality of frames that do not include the marking as one of the data payload frames.

4. The method of claim 3, wherein the first network node and the second network node belong to be part of a topology of the telecommunication network, the topology is selected from one of the following: point-to-point, star, mesh, chain, bus, or ring, or a combination of two or more topologies.

5. The method of claim 3, wherein the first network node and the second network node communicate through one or more channels of different media, the media including one or more of the following: free space optical communication, radio frequency, E band, microwave, mobile wireless, fixed wireless, or an Ethernet based transport facility.

6. The method of claim 1, wherein generating the data plane frame is performed by a first processor of the first network node, the first processor belonging to the data plane, and generating the control plane frame is performed by a second processor of the first network node, the second processor belonging to the control plane.

7. The method of claim 6, wherein the first processor is a network processing unit (NPU) or a field-programmable gate array (FPGA) and the second processor is a central processing unit (CPU).

8. The method of claim 6, wherein determining, based on the mapping information, whether the control plane message is to be sent via the first agent or the second agent is performed by a third processor of the first network node, the third processor, based on a mapping function and the mapping information, determines whether to transmits the control plane message to the first processor or the second processor.

9. The method of claim 1, wherein the data plane frame encoded the control plane message is codified in a specific format.

10. The method of claim 9, wherein the specific format complies with the Ethernet frame standard.

11. The method of claim 1, wherein transmitting the data plane frame via the first agent is via a channel operating at the channel's line rate.

12. The method of claim 1, wherein the control plane message is part of a network traffic control function to be added to or removed from the telecommunication network.

13. The method of claim 1, wherein the control plane message is transmitted from an external source through an application program interface of the telecommunication network.

14. The method of claim 1, wherein the telecommunication network is a local network that includes free space optical communication.

15. The method of claim 1, wherein the mapping information includes port information, traffic control function, and quality of service specification.

16. The method of claim 1, wherein the telecommunication network includes a plurality of channels, the method further comprises:
determining states of the plurality of channels; and
determining a mapping of the control plane message based on the mapping information and the states of the channels to determine whether the control plane message is to be sent via the data plane or the control plane.

17. The method of claim 1, further comprising:
replicating, at the first network node, the data plane frame encoding the control plane message to generate copies of the control plane message;
sending the copies through a plurality of channels to a second network node; and
selecting, at the second network node, one or more received copies transmitted via the plurality of channels.

18. A network node in a telecommunication network having a data plane and a control plane, wherein the network node comprises a first agent and a second agent, the network node comprising:
a first processor configured to determine, based on mapping information associated with a control plane message received or generated at the network node, whether the control plane message is to be sent via the first agent or the second agent;
a second processor configured to, responsive to the first processor determining that the control plane message is to be sent via the first agent, at least:
transmit the control plane message under the first agent by injecting a data plane frame encoding the control plane message into a traffic of data payload frames for transmission of the data plane fame via the data plane, the data plane frame carrying a version of the control plane message and having a marking signifying that the data plane frame carries the control plane message, and
a third processor configured to, responsive to the first processor determining that the control plane message is to be sent via the second agent, at least cause a generation of a message frame that encapsulates the control plane message, wherein the message frame is transmitted by the second agent via the control plane or via the data plane during a lapse of data plane traffic.

19. The network node of claim 18, wherein the first processor is a network processing unit (NPU) or a field-programmable gate array (FPGA) and the second processor is a central processing unit (CPU).

20. The network node of claim 18, wherein the control plane message is transmitted from an external source through an application program interface of the telecommunication network.

* * * * *